(12) United States Patent
Kwon et al.

(10) Patent No.: US 12,447,137 B2
(45) Date of Patent: Oct. 21, 2025

(54) COMPOSITION FOR PREVENTION, AMELIORATION, OR TREATMENT OF CANCER

(71) Applicants: EWHA UNIVERSITY—INDUSTRY COLLABORATION FOUNDATION, Seoul (KR); CHA UNIVERSITY INDUSTRY—ACADEMIC COOPERATION FOUNDATION, Seoul (KR); INDUSTRY—ACADEMIC COOPERATION FOUNDATION, YONSEI UNIVERSITY, Seoul (KR)

(72) Inventors: Youngjoo Kwon, Seoul (KR); Soo-Yeon Hwang, Seoul (KR); Hyunji Jo, Seoul (KR); Seojeong Park, Seoul (KR); Younghwa Na, Seoul (KR); Eosu Kim, Seoul (KR); Jihyeon Jeong, Seoul (KR); Minsun Park, Seoul (KR); Hyunjeong Kim, Seoul (KR)

(73) Assignees: Ewha University—Industry Collaboration Foundation, Seoul (KR); Cha University Industry-Academic Cooperation Foundation, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 906 days.

(21) Appl. No.: 17/615,008

(22) PCT Filed: May 27, 2020

(86) PCT No.: PCT/KR2020/006868
§ 371 (c)(1),
(2) Date: Nov. 29, 2021

(87) PCT Pub. No.: WO2020/242201
PCT Pub. Date: Dec. 3, 2020

(65) Prior Publication Data
US 2022/0226263 A1 Jul. 21, 2022

(30) Foreign Application Priority Data

May 30, 2019 (KR) .................. 10-2019-0063888
May 27, 2020 (KR) .................. 10-2020-0063730

(51) Int. Cl.
*A61K 31/136* (2006.01)
*A61K 31/18* (2006.01)
(Continued)

(52) U.S. Cl.
CPC ............ *A61K 31/136* (2013.01); *A61K 31/18* (2013.01); *A61K 31/4453* (2013.01);
(Continued)

(58) Field of Classification Search
CPC ..................................................... A61P 35/00
See application file for complete search history.

(56) References Cited

U.S. PATENT DOCUMENTS

2006/0135585 A1* 6/2006 Day .................. C07D 233/70
548/215
2009/0252694 A1 10/2009 Park et al.
2010/0068730 A1 3/2010 Park

FOREIGN PATENT DOCUMENTS

CN        101528210 A    9/2009
KR   10-2008-0052391 A   6/2008
(Continued)

OTHER PUBLICATIONS

Kraege, S.; Kohler, S.C.; Wiese, M. "Acryloylphenylcarboxamides: A New Class of Breast Cancer Resistance Protein (ABCG2) Modulators" ChemMedChem 2016, 11, 2422-2435 (Year: 2016).*
(Continued)

*Primary Examiner* — Andrew D Kosar
*Assistant Examiner* — John D Mcanany
(74) *Attorney, Agent, or Firm* — McDonnell Boehnen Hulbert & Berghoff LLP

(57) ABSTRACT

The alpha-beta unsaturated aryl, heteroaryl and cycloalkylene ketone compounds described herein may be very effectively used not only to prevent, ameliorate or treat
(Continued)

cancer, but also to inhibit metastasis of cancer, by inhibiting the growth of cancer cells and very effectively inhibiting the metastasis of cancer cells to other tissues.

14 Claims, 14 Drawing Sheets

(51) Int. Cl.
    *A61K 31/4453*     (2006.01)
    *A61K 31/495*     (2006.01)
    *A61K 45/06*     (2006.01)
    *A61P 35/00*     (2006.01)

(52) U.S. Cl.
    CPC ............ *A61K 31/495* (2013.01); *A61K 45/06* (2013.01); *A61P 35/00* (2018.01)

(56) References Cited

FOREIGN PATENT DOCUMENTS

| | | | |
|---|---|---|---|
| KR | 10-2012-0047513 | A | 5/2012 |
| KR | 10-2014-0147619 | A | 12/2014 |
| KR | 20140147619 | A | 12/2014 |
| KR | 10-2015-0025601 | A | 3/2015 |
| WO | 2007114532 | A1 | 10/2007 |
| WO | 2008069608 | A1 | 6/2008 |

OTHER PUBLICATIONS

PCT International Search Report and Written Opinion, Application No. PCT/KR2020/006868, dated Sep. 3, 2020, 13 pages (English translation included).

Wu, Jianzhang, Cong Wang, Yuepiao Cai, Jing Peng, Donglou Liang, Yunjie Zhao, Shulin Yang, Xiaokun Li, Xiaoping Wu, and Guang Liang. "Synthesis and crystal structure of chalcones as well as on cytotoxicity and antibacterial properties." Medicinal Chemistry Research 21, No. 4 (2012): 444-452.

Suwito, H., Mustofa Jumina, N. Matuzahroh, and N. N. T. Puspaningsih. "Anticancer and antimicrobial activity of methoxy amino chalcone derivatives." Der Pharma Chemica 7, No. 3 (2015): 89-94.

N.K. Sahu, et al., "Exploring Pharmacological Significance of Chalcone Scaffold: A Review", Current Medicinal Chemistry, (2012), vol. 19(2), pp. 209-225.

Dong-Ju Fu, et al., "Design and antiproliferative activity of N-heterocycle-chalcone derivatives", Journal of Chemical Research, (2016), vol. 40, October, pp. 620-623.

Liu, et al., "Antiproliferative activity of chalcones with basic functionalities", Bioorganic & Medicinal Chemistry (2007), vol. 15, pp. 7021-7034.

\* cited by examiner

COMPOSITION FOR PREVENTION, AMELIORATION, OR TREATMENT OF CANCER

CROSS-REFERENCE TO RELATED APPLICATIONS

This application is a U.S. National Stage entry of International Patent Application no. PCT/KR2020/006868, which claims the benefit of Korean Patent Applications nos. 10-2019-0063888, filed May 30, 2019, and 10-2020-0063730, filed May 27, 2020.

TECHNICAL FIELD

The present disclosure relates to a composition for preventing, ameliorating or treating cancer.

BACKGROUND ART

Cancer is a very fatal disease that can threaten the life of an individual by causing tissue cells to proliferate abnormally and unlimitedly to form a tumor that prevents the organ from performing its normal function. In 2017, the first leading cause of death in Korea was malignant neoplasm (cancer), and 27.6% of the total deaths were due to cancer. Although there is a difference in the site of cancer depending on race, gender and region, prostate cancer is the most common cancer in men in most countries, and breast cancer is the most common cancer in women. In particular, breast cancer is the highest cause of death in female cancer patients worldwide, and the incidence of most cancers worldwide is declining, whereas the incidence of breast cancer, which can be caused by various factors such as environmental and genetic factors, is increasing every year.

Taxol, one of the current anticancer drugs approved by the FDA, is used for the treatment of ovarian cancer, breast cancer, lung cancer, etc., and acts as a mechanism to inhibit cell division by binding to the spindle of cells in order to inhibit the growth of disorderly proliferating cancer cells. Thus, the use of this anticancer drug causes various adverse effects such as hair loss, muscle pain and diarrhea. However, despite such adverse effects, this anticancer agent has been continuously used in clinical practice because it very effectively inhibits the division of cancer cells.

Meanwhile, in malignant tumors against which the therapeutic effects of general anticancer drugs do not appear, a phenomenon is frequently observed in which tumor cells developed in a specific organ (primary organ) of an individual acquire new genetic traits necessary for metastasis as the cancer progresses, and then invade blood vessels and lymph glands, circulate along the lymph from the primary organ, settle in tissues existing in other organs, and then proliferate. Local treatment and systemic treatment methods may be used to treat metastasis of such malignant tumors. In the case of a malignant tumor known to have severe local symptoms caused by metastasis thereof or known that that surgical treatment of metastasis thereof can improve the clinical course of the malignant tumor, local treatment methods such as therapeutic surgery or radiotherapy may be used. However, with the exception of a very small number of tumors such as lymphoma, the likelihood of curing malignant tumors that have metastasized is very low.

Accordingly, there is an urgent need to develop an effective anticancer drug that can prevent cancer cell metastasis to organs such as the lungs while overcoming the disadvantages of anticancer drugs developed for cancer treatment to date, such as low specificity for cancer cells and a lot of adverse effects.

DISCLOSURE

Technical Problem

An object of the present disclosure is to provide a pharmaceutical composition, a food composition and a cosmetic composition for preventing, ameliorating or treating cancer.

Another object of the present disclosure is to provide a pharmaceutical composition, a food composition and a cosmetic composition for inhibiting metastasis of cancer.

Still another object of the present disclosure is to provide a method for preventing or treating cancer.

Yet another object of the present disclosure is to provide a method for inhibiting metastasis of cancer.

However, objects to be achieved by the present disclosure are not limited to the objects mentioned above, and other objects not mentioned herein will be clearly understood by those of ordinary skill in the art from the following description.

Technical Solution

An embodiment of the present disclosure provides a composition for preventing, ameliorating or treating cancer, the composition containing, as an active ingredient, a compound represented by the following Formula 1:

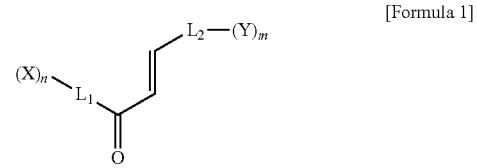

[Formula 1]

wherein:
$L_1$ and $L_2$ are each independently selected from the group consisting of $C_3$ to $C_{40}$ cycloalkylene, $C_6$ to $C_{60}$ arylene, and a heteroarylene having 5 to 60 nuclear atoms;

X and Y are each independently selected from the group consisting of deuterium, a halogen, cyano, nitro, sulfonyl, $C_1$ to $C_{10}$ alkylsulfonyl, azide, hydroxy, $C_1$ to $C_{40}$ alkyl, $C_2$ to $C_{40}$ alkenyl, $C_1$ to $C_{40}$ alkoxy, unsubstituted or substituted $C_6$ to $C_{60}$ aryloxy, unsubstituted or substituted $C_3$ to $C_{40}$ cycloalkyl, an unsubstituted or substituted heterocycloalkyl having 3 to 20 nuclear atoms, unsubstituted or substituted $C_6$ to $C_{60}$ aryl, an unsubstituted or substituted heteroaryl having 5 to 60 nuclear atoms, and —NR'R";

R' and R" are each independently selected from the group consisting of hydrogen, $C_1$ to $C_{10}$ alkyl, $C_6$ to $C_{60}$ aryl, $C_3$ to $C_{40}$ cycloalkyl, $C_6$ to $C_{60}$ arylsulfonyl, and a heteroaryl having 5 to 60 nuclear atoms;

n and m are each independently an integer ranging from 0 to 5, provided that n and m are not 0 at the same time;

when X or Y is plural, the plurality of X or Y may be the same as or different from each other; and the arylsulfonyl of each of R' and R" may be unsubstituted or substituted with at least one substituent selected from the group consisting of deuterium, halogen, and nitro.

The compound represented by Formula 1 according to the present disclosure may very effectively inhibit uncontrolled cell growth of cancer, also called neoplasia. Since the composition of the present disclosure may induce uncontrolled cell death (apoptosis) and may inhibit the growth of cancer by inhibiting cell growth, it may be used very effectively for the prevention, amelioration or treatment of cancer.

The term "aryl" as used in the present disclosure refers to a monovalent substituent derived from a $C_6$ to $C_{40}$ aromatic hydrocarbon having a single ring or two or more rings combined with each other. In addition, aryl may also include a form in which two or more rings are pendant (for example, simply attached) to or fused with each other. Examples of such aryl include, but are not limited to, phenyl, naphthyl, phenanthryl, and anthryl.

The term "arylene" as used in the present disclosure refers to a group of atoms obtained by removing one hydrogen atom from an aromatic hydrocarbon, and also includes those having a fused ring or those in which two or more independent benzene rings or fused rings are bonded directly or through a group such as vinylene. The arylene group may have any substituent described in the present disclosure, for example, alkoxy, and the number of carbon atoms in the moiety excluding the substituent is generally about 6 to 60. In addition, the total number of carbon atoms including the arylene group including the substituent is generally about 6 to 100. Examples of this arylene group include, but are not limited to, a phenylene group, a naphthalenediyl group, a dimethoxybenzyl group, an anthracene-diyl group, a biphenyl-diyl group, a terphenyl-diyl group, a fused compound group, a fluorene-diyl group, a stilbene-diyl group, a distyrene diyl group, a benzofluorene-diyl group, a dibenzofluorene-diyl group, and the like.

As used in the present disclosure, the term "heteroarylene" refers to a bivalent monocyclic aromatic group or a bivalent polycyclic aromatic group, which contains at least one aromatic ring containing, in the ring, one or more heteroatoms independently selected from O, S, and N. Each ring of the heteroarylene group may contain one or two O atoms, one or two S atoms, and/or 1 to 4 N atoms, provided that the total number of heteroatoms in each ring is 4 or less and each ring contains at least one carbon atom. Examples of heteroarylene include, but are not limited to, benzofuranylene, benzimidazolylene, benzoisoxazolylene, benzopyranylene, benzothiadiazolylene, benzothiazolylene, benzothienylene, benzotriazolylene, benzoxazolylene, furopyridylene, imidazopyridinylene, imidazothiazolylene, indolizinylene, indolylene, indazolylene, isobenzofuranylene, isobenzothienylene, isoindolylene, isoquinolinylene, isothiazolylene, naphthyridinylene, oxazolopyridinylene, phthalazinylene, pteridinylene, furinylene, pyridopyridylene, pyrrolopyridylene, quinolinylene, quinoxalinylene, quinazolinylene, thiadiazolopyrimidylene, and thienopyridylene. Examples of tricyclic heteroarylene group include, but are not limited to, acridinylene, benzindolylene, carbazolylene, dibenzofuranylene, perimidinylene, phenanthrolinylene, phenantridinylene, phenarsazinylene, phenazinylene, phenothiazinylene, phenoxazinylene and the like.

As used in the present disclosure, the term "alkyl" refers to a linear or branched saturated monovalent hydrocarbon radical, wherein the alkyl may be optionally substituted with one or more substituents described in the present disclosure. Examples of alkyl include, but are not limited to, methyl, ethyl, propyl (including all isomeric forms thereof), n-propyl, isopropyl, butyl (including all isomeric forms thereof), n-butyl, isobutyl, sec-butyl, t-butyl, pentyl (including all isomeric forms thereof), and hexyl (including all isomeric forms thereof).

As used in the present disclosure, the term "alkylsulfonyl group" includes a methylsulfonyl group, an ethylsulfonyl group, an n-propylsulfonyl group, an i-propylsulfonyl group, a t-butylsulfonyl group, and the like. The number of carbon atoms constituting the alkylsulfonyl group is preferably 1 to 10, but is not limited thereto.

As used in the present disclosure, the term "alkenyl" refers to a linear or branched monovalent hydrocarbon radical that contains one or more carbon-carbon double bond(s), wherein the number of the carbon-carbon double bond(s) is 1 to 5, in an embodiment, and is one, in another embodiment. The alkenyl may be optionally substituted with one or more substituents described in the present disclosure. As understood by those skilled in the art, the term "alkenyl" includes radicals having a "cis" or "trans" structure or a mixture thereof, or alternatively a "Z" or "E" structure or a mixture thereof. Examples of alkenyl include, but are not limited to, ethenyl, propen-1-yl, propen-2-yl, allyl, butenyl, and 4-methylbutenyl.

As used in the present disclosure, the term "aryloxy" is a monovalent substituent represented by RO—, wherein R represents an aryl having 5 to 40 carbon atoms. Examples of aryloxy include, but are not limited to, phenyloxy, naphthyloxy, diphenyloxy, and the like.

As used in the present disclosure, the term "heterocycloalkyl" refers to a monovalent monocyclic system having 3 to 20 ring atoms, which contains 1 to 3 heteroatoms selected from N, O, P, or S, with the remaining ring atoms being C. One or more hydrogen atoms in the heterocycloalkyl group may be optionally substituted. Examples of the heterocycloalkyl group include, but are not limited to, pyrrolidinyl, pyrazolidinyl, imidazolidinyl, piperidinyl, and piperazine.

As used in the present disclosure, the term "alkoxy" refers to a monovalent substituent represented by R'O—, wherein R' represents an alkyl having 1 to 40 carbon atoms, which may include a linear, branched, or cyclic structure. Examples of alkyloxy include, but are not limited to, methoxy, ethoxy, n-propoxy, 1-propoxy, t-butoxy, n-butoxy, pentoxy, and the like.

As used herein, the term "arylamine" refers to an amine substituted with aryl having 6 to 40 carbon atoms.

As used in the present disclosure, the term "cycloalkyl" refers to a monovalent substituent derived from a monocyclic or polycyclic non-aromatic hydrocarbon having 3 to 40 carbon atoms. Examples of such cycloalkyl include, but are not limited to, cyclopropyl, cyclopentyl, cyclohexyl, norbornyl, adamantine, and the like.

As used in the present disclosure, the term "halogen" refers to fluorine, chlorine, bromine, and/or iodine.

As used in the present disclosure, the term "substituted alkyl", "substituted alkylene", "substituted heteroalkylene", "substituted alkenyl", "substituted alkenylene", "substituted heteroalkenylene", "substituted alkynyl", "substituted alkynylene", "substituted cycloalkyl", "substituted heterocycloalkyl", "substituted cycloalkylene", "substituted aryl", "substituted aryloxy", "substituted arylene", "substituted aralkyl", "substituted heteroaryl", "substituted heteroarylene", "substituted heterocyclic", or "substituted heterocyclylene" means that the substituted alkyl, the substituted alkynyl, the substituted alkynylene, the substituted cycloalkyl, the substituted heterocycloalkyl, the substituted cycloalkylene, the substituted aryl, the substituted aryloxy, the substituted arylene, the substituted aralkyl, the substituted heteroaryl, the substituted heteroarylene, the substituted heterocyclic, or the substituted heterocyclylene may be, each independently, further substituted with one or more substituents, for example, independently selected from the following: $C_{1-6}$ alkyl, $C_{1-6}$ alkoxy, $C_{2-6}$ alkenyl, $C_{2-6}$ alkynyl, $C_{3-7}$ cycloalkyl, $C_{6-14}$ aryl, $C_{7-15}$ aralkyl, heteroaryl, heterocyclyl, hydroxy, oxo (=O), halo, cyano (—CN), nitro (—NO$_2$), —C(O)R$_a$, —C(O)OR$_a$, —C(O)NR$_b$R$_c$, —C(NR$_a$)NR$_b$R$_c$, —OR$_a$, —OC(O)R$_a$, —OC(O)OR$_a$, —OC(O)NR$_b$R$_c$, —OC(=NR$_a$)NR$_b$R$_c$, —OS(O)R$_a$, —OS(O)$_2$R$_a$, —OS(O)NR$_b$R$_c$, —OS(O)$_2$NR$_b$R$_c$, —NR$_b$R$_c$, —NR$_a$C(O)R$_d$, —NR$_a$C(O)OR$_d$, —NR$_a$C(O)NR$_b$R$_c$, —NR$_a$C(=NR$_d$)NR$_b$R$_c$, —NR$_a$S(O)R$_d$, —NR$_a$S(O)$_2$R$_d$, —NR$_a$S(O)NR$_b$R$_c$, —NR$_a$S(O)$_2$NR$_b$R$_c$, —SR$_a$, —S(O)R$_a$, —S(O)$_2$R$_a$, —S(O)NR$_b$R$_c$, and —S(O)$_2$NR$_b$R$_c$, wherein R$_a$, R$_b$, R$_c$, and R$_d$ may be each independently (a) hydrogen; or (b) $C_{1-6}$ alkyl, $C_{2-6}$ alkenyl, $C_{2-6}$ alkynyl, $C_{3-7}$ cycloalkyl, $C_{6-14}$ aryl, $C_{7-15}$ aralkyl, heteroaryl, or heterocyclyl; or (c) R$_b$ and R$_c$ together with a N atom to which they are attached may form substituted heterocyclyl.

In the present disclosure, the compound represented by Formula 1 may be a compound represented by the following Formula 2 below, but is not limited thereto:

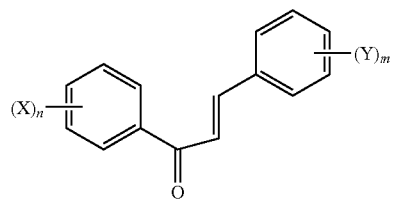

[Formula 2]

wherein n, m, X and Y are each as defined in Formula 1 above.

In a preferred example of the present disclosure, in Formula 2, n and m may be each independently an integer of 1 or 2;

X and Y may be each independently selected from the group consisting of sulfonyl, $C_1$ to $C_{10}$ alkylsulfonyl, $C_1$ to $C_{40}$ alkoxy, —NR'R", hydroxy, $C_6$ to $C_{60}$ aryloxy, and an unsubstituted or substituted heterocycloalkyl having 3 to 20 nuclear atoms;

R' and R" may be each independently hydrogen or $C_6$ to $C_{60}$ arylsulfonyl, and the arylsulfonyl of each of R' and R" may be unsubstituted or substituted with at least one halogen.

In a preferred example of the present disclosure, in Formula 2, n may be 1;

X may be —NR'R" or a substituent represented by the following Formula 3; and

R' and R" may be each independently hydrogen or a substituent represented by the following Formula 4:

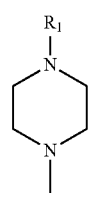

[Formula 3]

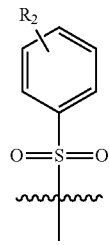

[Formula 4]

wherein

R$_1$ may be selected from the group consisting of hydrogen, deuterium, a halogen, hydroxy, $C_1$ to $C_{40}$ alkyl, and $C_2$ to $C_{40}$ alkenyl, and preferably, R$_1$ may be hydrogen or hydroxy; and R$_2$ may be selected from the group consisting of hydrogen, deuterium, a halogen, and nitro, preferably a halogen, more preferably chlorine, but is not limited thereto.

In a preferred example of the present disclosure, in Formula 2 above,

Y may be hydroxy, $C_1$ to $C_6$ alkoxy, or a substituent represented by the following Formula 5, but is not limited thereto:

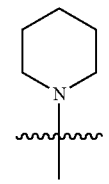

[Formula 5]

In a preferred example of the present disclosure, in Formula 2, n may be 1;

X may be —NR'R";

R' and R" may be each independently hydrogen or the substituent represented by Formula 5 above;

m may be 2;

Y may be a substituent of a $C_1$ alkoxy group, but is not limited thereto.

In the present disclosure, the compound represented by Formula 1 may be any one selected from the group consisting of the following compounds, but is not limited thereto:

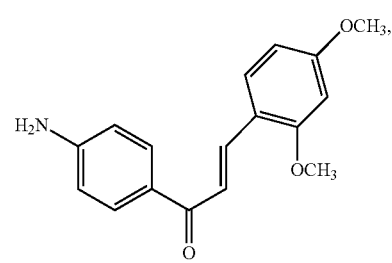

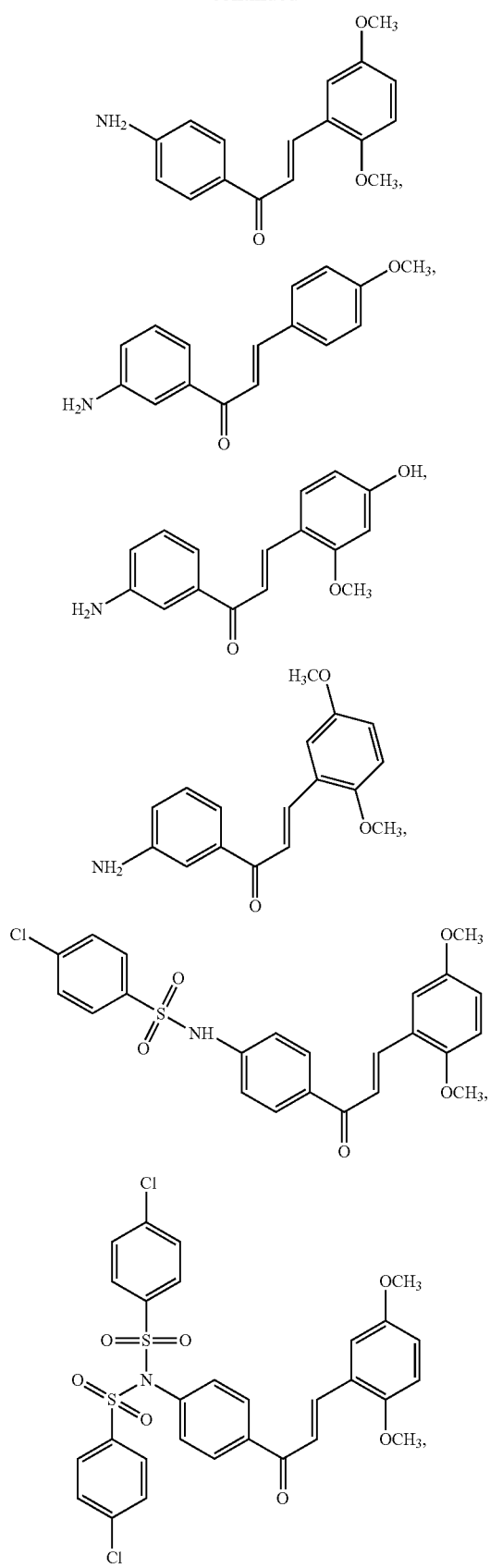
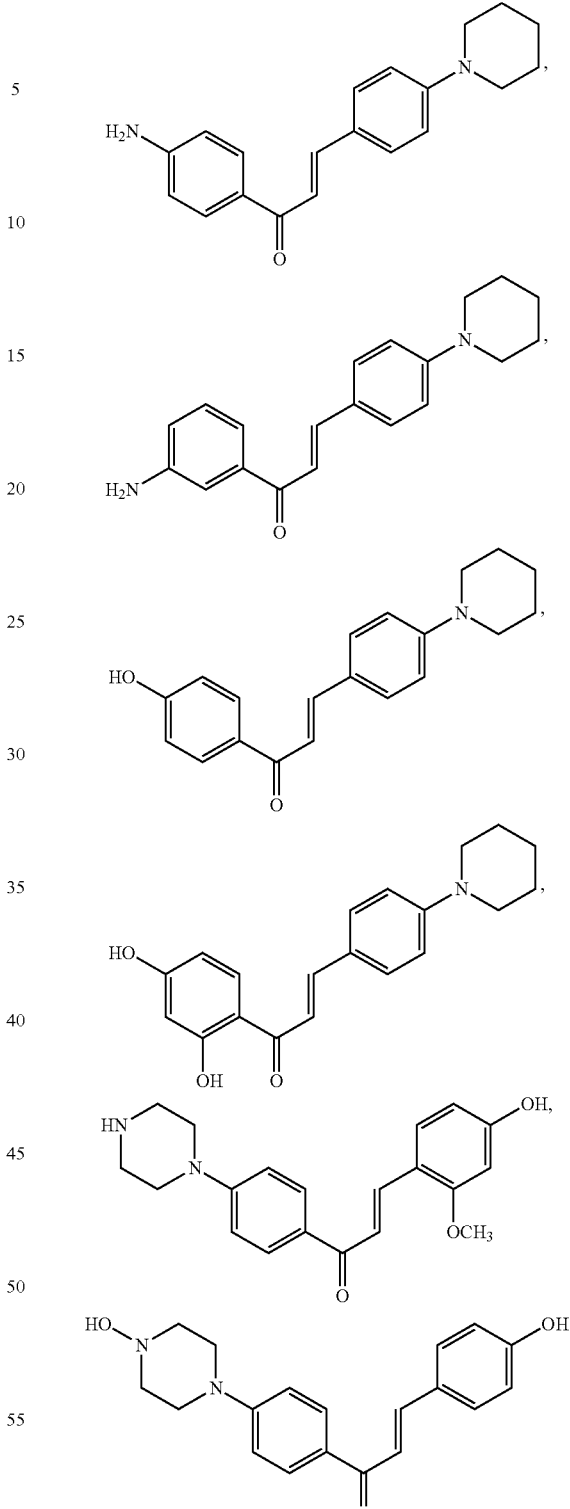
In another embodiment of the present disclosure, the compound may be the following compound, but is not limited thereto:

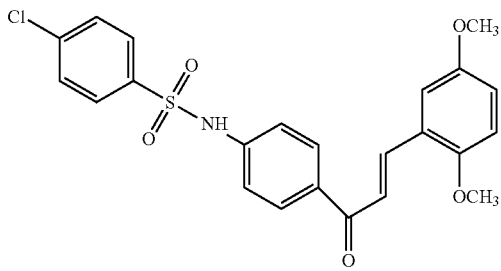 [SMILES: COc1ccc(OC)c(/C=C/C(=O)c2ccc(NS(=O)(=O)c3ccc(Cl)cc3)cc2)c1]

In another embodiment of the present disclosure, the compound may be the following compound, but is not limited thereto:

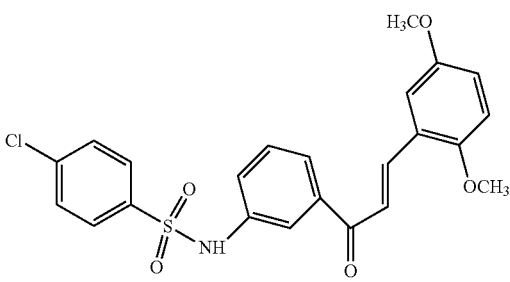 [SMILES: COc1ccc(OC)c(/C=C/C(=O)c2cccc(NS(=O)(=O)c3ccc(Cl)cc3)c2)c1]

The cancer in the present disclosure may be at least one selected from the group consisting of breast cancer, colorectal cancer, lung cancer, liver cancer, gastric cancer, esophageal cancer, pancreatic cancer, gallbladder cancer, kidney cancer, bladder cancer, prostate cancer, testicular cancer, colon cancer, cervical cancer, endometrial cancer, chorionic carcinoma, skin cancer, ovarian cancer, thyroid cancer, brain cancer, blood cancer, head and neck cancer, malignant melanoma, and lymphoma, and may preferably be breast cancer, but is not limited thereto.

The breast cancer in the present disclosure may be triple negative breast cancer, but is not limited thereto.

The term "triple-negative breast cancer" as used in the present disclosure refers to breast cancer that is negative for estrogen receptor, progesterone receptor, and Her2 gene, easily recurs and metastasizes, and is not cured by a conventional target therapeutic agent used for breast cancer.

As used herein, the term "preventing" may include, without limitation, any action of blocking, suppressing or delaying symptoms, which are caused by uncontrolled growth of cancer cells, by using the composition of the present disclosure.

As used herein, the term "ameliorating" may include, without limitation, any action of alleviating or beneficially changing symptoms, which are caused by uncontrolled growth of cancer cells, etc., by using the composition of the present disclosure.

As used herein, the term "treating" may include, without limitation, any action of alleviating or beneficially changing symptoms, caused by uncontrolled growth of cancer cells, etc., by using the composition of the present disclosure.

Another embodiment of the present disclosure provides a composition for inhibiting metastasis of cancer, the composition containing, as an active ingredient, a compound represented by the following Formula 1:

[Formula 1]

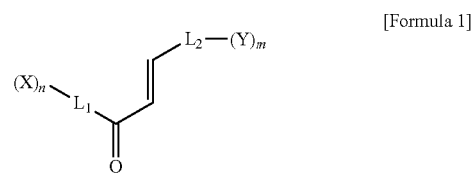

wherein n, m, X and Y are each as defined in Formula 1 with respect to the composition for preventing, ameliorating or treating cancer.

In the present disclosure, "metastasis of cancer" refers to a phenomenon in which tumor cells developed in a primary organ acquire new genetic traits necessary for metastasis as the cancer progresses, and then invade blood vessels and lymph glands, circulate along the lymph from the primary organ, settle in tissues existing in other organs, and then proliferate. For the purposes of the present disclosure, the composition according to the present disclosure can inhibit cancer metastasis by inhibiting some or all of the steps in which cancer cells escape from a primary organ, invade blood vessels and lymph glands, and settle in other organs, and thus the composition may be very effectively used for the purpose of inhibiting metastasis of cancer. Preferably, the metastasis of cancer in the present disclosure may refer to, but is not limited to, lung metastasis, more preferably metastasis from breast cancer to the lung, which is a phenomenon in which cancer cells developed in the breast as the primary organ settle and proliferate in the lung, which is another organ.

In the composition for inhibiting metastasis of cancer according to the present disclosure, details regarding the compound represented by Formula 1 and the cancer are the same as those described above with respect to the composition for preventing, ameliorating or treating cancer, and thus description thereof will be omitted to avoid excessive complexity of the present specification.

The composition of the present disclosure may be embodied as a pharmaceutical composition, a food composition or a cosmetic composition.

In addition, the composition of the present disclosure may be further administered in combination with other anticancer drug. When the composition is used in combination with other anticancer agent, it may exhibit a remarkable effect on the prevention or treatment of cancer by more effectively inhibiting the growth or metastasis of cancer.

The anticancer drug in the present disclosure may be at least one selected from the group consisting of nitrogen mustard, imatinib, oxaliplatin, rituximab, erlotinib, neratinib, lapatinib, gefitinib, vandetanib, nirotinib, semasanib, bosutinib, axitinib, cediranib, lestaurtinib, trastuzumab, gefitinib, bortezomib, sunitinib, carboplatin, sorafenib, bevacizumab, cisplatin, cetuximab, viscumalbum, asparaginase, tretinoin, hydroxycarbamide, dasatinib, estramustine, gemtuzumab ozogamicin, ibritumomab tiuxetan, heptaplatin, methylaminolevulinic acid, amsacrine, alemtuzumab, procarbazine, alprostadil, holmium nitrate chitosan, gemcitabine, doxyfluridine, pemetrexed, tegafur, capecitabine, gimeracin, oteracil, azacitidine, methotrexate, uracil, cytarabine, fluorouracil, fludagabine, enocitabine, flutamide, capecitabine, decitabine, mercaptopurine, thioguanine, cladribine, carmopher, raltitrexed, docetaxel, paclitaxel, irinotecan, belotecan, topotecan, vinorelbine, etoposide, vinblastine, idarubicin, mitomycin, bleromycin, dactinomycin, pyrarubicin, aclarubicin, pepromycin, temsirolimus, temozolomide, busulfan, ifosfamide, cyclophosphamide, melparan, altretmine, dacarbazine, thiotepa, nimustine, chlorambucil, mitolactol, leucovorin, tretinoin, exemestane, aminoglutethimide, anagrelide, olaparib, nabelbine, fadrazole, tamoxifen, toremifene, testolactone, anastrozole, letrozole, vorozole, bicalutamide, lomustine, 5FU, vorinostat, entinostat, and carmustine, but is not limited thereto.

The pharmaceutical composition of the present disclosure may be in the form of capsules, tablets, granules, injections, ointments, powders or beverages, and the pharmaceutical composition may be for use in humans.

For use, the pharmaceutical composition of the present disclosure may be formulated into oral dosage forms such as powders, granules, capsules, tablets, aqueous suspensions and the like, and forms such as external preparations, suppositories and sterile injectable solutions, according to conventional methods, but is not limited thereto. The pharmaceutical composition of the present disclosure may contain a pharmaceutically acceptable carrier. For oral administration, the pharmaceutically acceptable carrier may include a binder, a lubricant, a disintegrant, an excipient, a solubilizer, a dispersing agent, a stabilizer, a suspending agent, a coloring agent, a flavoring agent and the like. For injectable preparations, the pharmaceutically acceptable carrier may include a buffering agent, a preservative, an analgesic, a solubilizer, an isotonic agent, a stabilizer and the like. For topical administration, the pharmaceutically acceptable carrier may include a base, an excipient, a lubricant, a preservative and the like.

The pharmaceutical composition of the present disclosure may be formulated into a variety of dosage forms in combination with the aforementioned pharmaceutically acceptable carriers. For example, for oral administration, the pharmaceutical composition may be formulated into tablets, troches, capsules, elixirs, suspensions, syrups, wafers or the like. For injectable administration, the pharmaceutical composition may be formulated as a unit dosage ampoule or a multiple dosage form. In addition, the pharmaceutical composition may also be formulated into solutions, suspensions, tablets, capsules and sustained-release preparations.

In the present disclosure, examples of carriers, excipients and diluents suitable for formulation include lactose, dextrose, sucrose, sorbitol, mannitol, xylitol, erythritol, maltitol, starch, gum acacia, alginate, gelatin, calcium phosphate, calcium silicate, cellulose, methyl cellulose, microcrystalline cellulose, polyvinyl pyrrolidone, water, methylhydroxy benzoate, propylhydroxy benzoate, talc, magnesium stearate, and mineral oil. In addition, the pharmaceutical composition of the present disclosure may further contain a filler, an anticoagulant, a lubricant, a wetting agent, a fragrance, an emulsifier, a preservative, or the like.

The routes of administration of the pharmaceutical composition according to the present disclosure include, but are not limited to, oral, intravenous, intramuscular, intra-arterial, intramedullary, intradural, intracardiac, transdermal, subcutaneous, intraperitoneal, intranasal, gastrointestinal, topical, sublingual and intrarectal routes. Oral or parenteral administration is preferred. In the present disclosure, "parenteral" includes subcutaneous, transdermal, intravenous, intramuscular, intra-articular, intra-synovial, intrasternal, intradural, intra-lesional and intra-cranial injection or infusion techniques.

The pharmaceutical composition of the present disclosure may vary depending on various factors, including the activity of a specific compound used, the patient's age, body weight, general health, sex, diet, the time of administration, the route of administration, excretion rate, the drug content, and the severity of a specific disease to be prevented or treated. The dose of the pharmaceutical composition may be suitably selected by a person skilled in the art depending on the patient's condition, body weight, the severity of the disease, the form of drug, and the route and period of administration, and may be 0.0001 to 50 mg/kg/day or 0.001 to 50 mg/kg/day. The pharmaceutical composition may be administered once or several times a day. The dose is not intended to limit the scope of the present disclosure in any way. The pharmaceutical composition according to the present disclosure may be formulated as pills, sugar-coated tablets, capsules, liquids, gels, syrups, slurries, or suspensions.

The food composition of the present disclosure may be prepared as various foods, for example, beverages, gums, teas, vitamin complexes, powders, granules, tablets, capsules, confectionery, rice cakes, bread and the like.

When the compound of the present disclosure is contained as an active ingredient in the food composition, it may be added in an amount of 0.1 to 50 wt % based on the total weight of the food composition, but is not limited thereto.

When the food composition of the present disclosure is prepared as a beverage, there is no particular limitation, except that the beverage contains the food composition at the indicated percentage. The beverage may additionally contain various flavorings or natural carbohydrates, like conventional beverages. Specifically, examples of the natural carbohydrates include monosaccharides such as glucose, disaccharides such as fructose, polysaccharides such as sucrose, conventional sugars such as dextrin, cyclodextrin or the like, and sugar alcohols such as xylitol, sorbitol, erythritol or the like. Examples of the flavorings include natural flavorings (thaumatin, *stevia* extracts, such as rebaudioside A, glycyrrhizin, etc.) and synthetic flavorings (saccharin, aspartame, etc.).

In addition, the food composition of the present disclosure may further contain various nutrients, vitamins, minerals (electrolytes), flavorings such as synthetic flavorings and natural flavorings, colorants, pectic acid and its salt, alginic acid and its salt, organic acids, protective colloidal thickeners, pH adjusting agents, stabilizers, preservatives, glycerin, alcohol, carbonizing agents that are used in carbonated beverages, etc.

The components that are contained in the food composition of the present disclosure may be used individually or in combination. Although the percentage of such additives is not critical to the present disclosure, it may be selected within a range of 0.1 to about 50 parts by weight based on 100 parts by weight of the food composition of the present disclosure, but is not limited thereto.

The cosmetic composition of the present disclosure may be prepared in the form of skin softener, nourishing lotion, nourishing essence, massage cream, cosmetic bath water additive, body lotion, body milk, bath oil, baby oil, baby powder, shower gel, shower cream, shower cream, sun screen lotion, sun screen cream, suntan cream, skin lotion, skin cream, UV blocking cosmetic, cleansing milk, hair removing agent (for cosmetic purposes), face and body lotion, face and body cream, skin whitening cream, hand lotion, hair lotion, cosmetic cream, Jasmine oil, bath soap, liquid soap, cosmetic soap, shampoo, hand cleaner, medicinal soap (for non-medical purposes), cream soap, facial wash, body cleanser, scalp cleanser, hair rinse, toilet soap, tooth whitening gel, toothpaste, or the like. To this end, the composition of the present disclosure may further contain either a solvent which is commonly used for the preparation of cosmetic compositions, or a suitable carrier, excipient or diluent.

In the present disclosure, the type of solvent that may further be added to the cosmetic composition is not particularly limited, and examples of the solvent may include water, saline, DMSO, or a combination thereof. In addition, examples of the carrier, excipient or diluent include, but are not limited to, purified water, oil, wax, fatty acids, fatty acid alcohols, fatty acid esters, surfactants, humectants, thickeners, antioxidants, viscosity stabilizers, chelating agents, buffers, lower alcohols, and the like. In addition, the cosmetic composition of the present disclosure may, if necessary, contain whitening agents, moisturizing agents, vitamins, UV blocking agents, fragrances, dyes, antibiotics, antibacterial agents, and antifungal agents.

In the present disclosure, examples of the oil include hydrogenated vegetable oil, castor oil, cottonseed oil, olive oil, palm kernel oil, jojoba oil, and avocado oil, and examples of the wax may include beeswax, spermaceti, carnauba wax, candelilla wax, montan wax, ceresin wax, liquid paraffin, and lanolin.

In the present disclosure, examples of the fatty acids include stearic acid, linoleic acid, linolenic acid, and oleic acid; examples of the fatty acid alcohols include cetyl alcohol, octyl dodecanol, oleyl alcohol, panthenol, lanolin alcohol, stearyl alcohol, and hexadecanol; and examples of the fatty acid esters include isopropyl myristate, isopropyl palmitate, and butyl stearate. Examples of the surfactants include cationic surfactants, anionic surfactants, and non-ionic surfactants, which are known in the art. Among these surfactants, if possible, surfactants derived from natural products are preferred.

In addition to the above-described components, the cosmetic composition of the present disclosure may contain humectants, thickeners, antioxidants, and the like, which are widely known in the cosmetic field, and the types and amounts thereof are as known in the art.

Still another embodiment of the present disclosure provides a method for preventing or treating cancer, the method including a step of administering an effective amount of a compound represented by the following Formula 1 to a subject in need of administration:

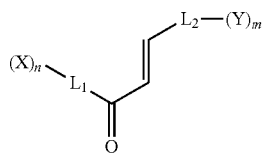

[Formula 1]

wherein n, m, X and Y are each as defined in Formula 1 above with respect to the composition for preventing, ameliorating or treating cancer.

In the method for preventing or treating cancer according to the present disclosure, details regarding the compound represented by Formula 1 and the cancer are the same as those described in the composition for preventing, ameliorating or treating cancer, description thereof will be omitted to avoid excessive complexity of the present specification.

Yet another embodiment of the present disclosure provides a method for inhibiting metastasis of cancer, the method including a step of administering an effective amount of a compound represented by the following Formula 1 to a subject in need of administration:

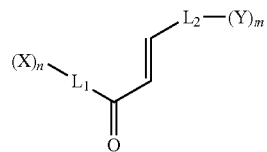

[Formula 1]

wherein n, m, X and Y are each as defined in Formula 1 above with respect to the composition for preventing, ameliorating or treating cancer.

In the method for inhibiting metastasis of cancer according to the present disclosure, details regarding the compound represented by Formula 1 and the cancer are the same as those described in the composition for inhibiting metastasis of cancer, and thus description thereof will be omitted to avoid excessive complexity of the present specification.

As used herein, the term "administering" means providing a given compound of the present disclosure to a subject by any suitable method.

In the present disclosure, the term "subject" in need of administration may include both mammals and non-mammals. Here, examples of the mammals include, but are not limited to, humans; non-human primates such as a chimpanzee, or other ape or monkey species; farm animals such as cattle, horses, sheep, goats, swine; domestic animals such as rabbits, dogs, and cats; laboratory animals including rodents, such as rats, mice or guinea pigs. In addition, in the present disclosure, examples of the non-mammals include, but are not limited to, birds or fish.

In the present disclosure, the formulation of the compound that is administered as described above is not particularly limited, and the composition may be administered as a solid formulation, a liquid formulation, or an aerosol formulation for inhalation, and may be administered as solid form preparations which are intended to be converted into liquid form preparations for oral or parenteral administration immediately before use. For example, the compound may be formulated and administered as oral dosage forms such as powders, granules, capsules, tablets, aqueous suspensions and the like, or forms such as external preparations, suppositories and sterile injectable solutions, but is not limited thereto.

In addition, in the present disclosure, a pharmaceutically acceptable carrier may be additionally administered together with the compound of the present disclosure. Here, for oral administration, the pharmaceutically acceptable carrier may include a binder, a lubricant, a disintegrant, an excipient, a solubilizer, a dispersant, a stabilizer, a suspending agent, a pigment, a flavoring agent, and the like. For injection, the pharmaceutically acceptable carrier may include a buffer, a preservative, an analgesic agent, a solubilizer, an isotonic agent, a stabilizer, and the like. For topical administration, the pharmaceutically acceptable carrier may include a base, an excipient, a lubricant, a preservative, and the like. The formulation of the compound of the present disclosure may be prepared in various ways by mixing with the pharmaceutically acceptable carrier described above. For example, for oral administration, the compound may be formulated in the form of tablet, troche, capsule, elixir, suspension, syrup, wafer or the like. For injectable administration, the compound may be formulated as a unit dosage ampoule or a multiple dosage form. In addition, the compound may also be formulated into a solution, a suspension, a tablet, a capsule or a sustained-release preparation.

Meanwhile, examples of carriers, excipients and diluents suitable for formulation include lactose, dextrose, sucrose, sorbitol, mannitol, xylitol, erythritol, maltitol, starch, gum acacia, alginate, gelatin, calcium phosphate, calcium silicate, cellulose, methyl cellulose, microcrystalline cellulose, polyvinyl pyrrolidone, water, methylhydroxy benzoate, propylhydroxy benzoate, talc, magnesium stearate, and mineral oil. In addition, the composition may further contain a filler, an anticoagulant, a lubricant, a wetting agent, a fragrance, an emulsifier, a preservative, or the like.

The routes of administration of the compound according to the present disclosure include, but are not limited to, oral, intravenous, intramuscular, intra-arterial, intramedullary, intradural, intracardiac, transdermal, subcutaneous, intraperitoneal, intranasal, gastrointestinal, topical, sublingual and intrarectal routes. Oral or parenteral administration is preferred.

In the present disclosure, "parenteral" includes subcutaneous, transdermal, intravenous, intramuscular, intra-articular, intra-synovial, intrasternal, intradural, intra-lesional and intra-cranial injection or infusion techniques. The pharmaceutical composition of the present disclosure may also be formulated as suppositories for intrarectal administration.

In the present disclosure, the term "pharmaceutically effective amount" refers to a sufficient amount of an agent to provide a desired biological result. That result may be reduction and/or alleviation of a sign, symptom, or cause of a disease, or any other desired alteration of a biological system. For example, an "effective amount" for therapeutic uses is the amount of the compound disclosed herein required to provide a clinically significant reduction in a disease. An appropriate "effective" amount in any individual case may be determined by one of ordinary skill in the art using routine experimentation. Accordingly, the expression "effective amount" generally refers to the amount of the active substance which has a therapeutic effect. In the case of the present disclosure, the active substance is an inhibitor of cancer cell growth, a preventive, ameliorating or therapeutic agent for cancer, and an inhibitor of cancer metastasis.

The dose of the compound of the present disclosure may vary depending on various factors, including the activity of a specific compound used, the patient's age, body weight, general health, sex, diet, the time of administration, the route of administration, excretion rate, the drug content, and the severity of a specific disease to be prevented or treated. The dose of the compound may be suitably selected by a person skilled in the art depending on the patient's condition, body weight, the severity of the disease, the form of drug, and the route and period of administration, and may be 0.0001 to 100 mg/kg/day or 0.001 to 100 mg/kg/day. The compound may be administered once or several times a day. The dose is not intended to limit the scope of the present disclosure in any way. The compound according to the present disclosure may be formulated as pills, sugar-coated tablets, capsules, liquids, gels, syrups, slurries, or suspensions.

The compounds of the present disclosure may be used alone or in combination with methods using surgery, radiotherapy, hormone therapy, chemotherapy, and biological response modifiers.

In addition, the compound of the present disclosure may be further used in combination with other anticancer drug. In this case, the anticancer drug may be at least one selected from the group consisting of nitrogen mustard, imatinib, oxaliplatin, rituximab, erlotinib, neratinib, lapatinib, gefitinib, vandetanib, nirotinib, semasanib, bosutinib, axitinib, cediranib, restaurtinib, trastuzumab, gefitinib, bortezomib, sunitinib, carboplatin, sorafenib, bevacizumab, cisplatin, cetuximab, viscumalbum, asparaginase, tretinoin, hydroxycarbamide, dasatinib, estramustine, gemtuzumab ozogamicin, ibritumomab tiuxetan, heptaplatin, methylaminolevulinic acid, amsacrine, alemtuzumab, procarbazine, alprostadil, holmium nitrate chitosan, gemcitabine, doxyfluridine, pemetrexed, tegafur, capecitabine, gimeracin, oteracil, azacitidine, methotrexate, uracil, cytarabine, fluorouracil, fludagabine, enocitabine, flutamide, kefecitabine, decitabine, mercaptopurine, thioguanine, cladribine, carmopher, raltitrexed, docetaxel, paclitaxel, irinotecan, belotecan, topotecan, vinorelbine, etoposide, vincristine, vinblastine, teniposide, doxorubicin, idarubicin, epirubicin, mitoxantrone, mitomycin, bleromycin, daunorubicin, dactinomycin, pirarubicin, aclarubicin, pepromycin, temsirolimus, temozolomide, busulfan, ifosfamide, cyclophosphamide, melparan, altretamine, dacarbazine, thiotepa, nimustine, chlorambucil, mitolactol, leucovorin, tretonin, exemestane, aminoglutethimide, anagrelide, olaparib, nabelbine, fadrazole, tamoxifen, toremifene, testolactone, anastrozole, letrozole, vorozole, bicalutamide, lomustine, vorinostat, entinostat, phenformin, metformin, talazoparib, and carmustine, but is not limited thereto.

Advantageous Effects

The composition according to the present disclosure may be very effectively used not only to prevent, ameliorate or treat cancer, but also to inhibit metastasis of cancer, by inhibiting the growth of cancer cells and very effectively inhibiting the metastasis of cancer cells to other tissues.

BEST MODE

Figure 1:
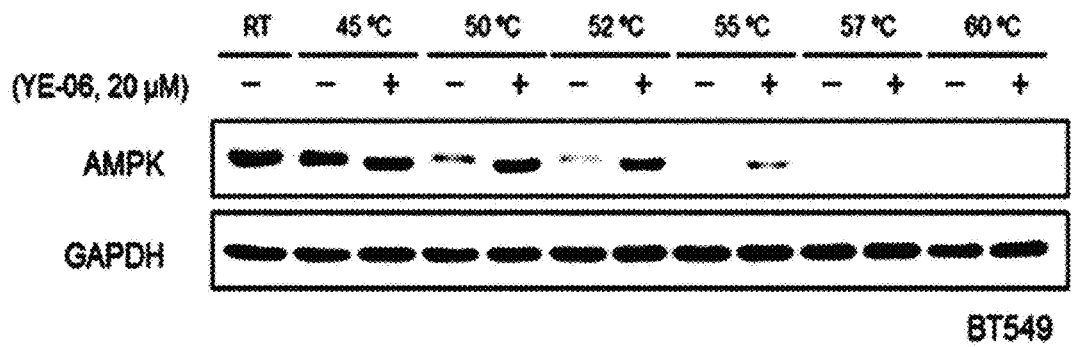
FIG. 1 shows the results of evaluating, by Western blot analysis, the effect of increasing the stability of AMPK protein in one example of the present disclosure.

An embodiment of the present disclosure is directed to a composition for preventing, ameliorating or treating cancer, the composition containing, as an active ingredient, a compound represented by Formula 1 below.

Another embodiment of the present disclosure is directed to a composition for inhibiting metastasis of cancer, the composition containing, as an active ingredient, a compound represented by Formula 1 below.

Still another embodiment of the present disclosure is directed to a method for preventing or treating cancer, the method including administering an effective amount of a compound represented by Formula 1 below to a subject in need of administration.

Yet another embodiment of the present disclosure is directed to a method for inhibiting metastasis of cancer, the method including administering an effective amount of a compound represented by Formula 1 below to a subject in need of administration.

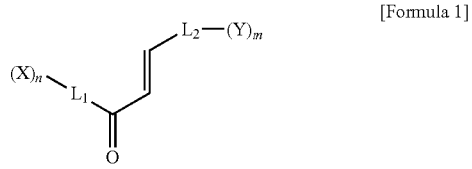

[Formula 1]

wherein:
- $L_1$ and $L_2$ are each independently selected from the group consisting of $C_3$ to $C_{40}$ cycloalkylene, $C_6$ to $C_{60}$ arylene, and a heteroarylene having 5 to 60 nuclear atoms;
- X and Y are each independently selected from the group consisting of deuterium, a halogen, cyano, nitro, sulfonyl, $C_1$ to $C_{10}$ alkylsulfonyl, azide, hydroxy, $C_1$ to $C_{40}$ alkyl, $C_2$ to $C_{40}$ alkenyl, $C_1$ to $C_{40}$ alkoxy, unsubstituted or substituted $C_6$ to $C_{60}$ aryloxy, unsubstituted or substituted $C_3$ to $C_{40}$ cycloalkyl, an unsubstituted or substituted heterocycloalkyl having 3 to 20 nuclear atoms, unsubstituted or substituted $C_6$ to $C_{60}$ aryl, an unsubstituted or substituted heteroaryl having 5 to 60 nuclear atoms, and —NR'R";
- R' and R" are each independently selected from the group consisting of hydrogen, $C_1$ to $C_{10}$ alkyl, $C_6$ to $C_{60}$ aryl, $C_3$ to $C_{40}$ cycloalkyl, $C_6$ to $C_{60}$ arylsulfonyl, and a heteroaryl having 5 to 60 nuclear atoms;
- n and m are each independently an integer ranging from 0 to 5, provided that n and m are not 0 at the same time;
- when X or Y is plural, the plurality of X or Y may be the same as or different from each other; and
- the arylsulfonyl of each of R' and R" may be unsubstituted or substituted with at least one substituent selected from the group consisting of deuterium, halogen, and nitro.

MODE FOR INVENTION

Hereinafter, the present disclosure will be described in more detail with reference to examples. It will be apparent to those of ordinary skill in the art that these examples are only for explaining the present disclosure in more detail, and the scope of the present disclosure according to the subject matter of the present disclosure is not limited by these examples.

EXAMPLES

[Production Examples 1 to 15] Synthesis of Candidate Compounds

The compounds of Production Examples 1 to 15 shown in Table 1 below were produced by Method 1 or Method 2.

TABLE 1

| Production Example | Compound |
| --- | --- |
| Production Example 1 (YE-01) | (E)-1-(4-aminophenyl)-3-(2,4-dimethoxyphenyl)prop-2-en-1-one |
| Production Example 2 (YE-02) | (E)-1-(4-aminophenyl)-3-(2,5-dimethoxyphenyl)prop-2-en-1-one |
| Production Example 3 (YE-03) | (E)-1-(3-aminophenyl)-3-(4-methoxyphenyl)prop-2-en-1-one |
| Production Example 4 (YE-04) | (E)-1-(3-aminophenyl)-3-(4-hydroxy-2-methoxyphenyl)prop-2-en-1-one |
| Production Example 5 (YE-05) | (E)-1-(3-aminophenyl)-3-(2,5-dimethoxyphenyl)prop-2-en-1-one |
| Production Example 6 (YE-06) | (E)-4-chloro-N-(4-(3-(2,5-dimethoxyphenyl)acryloyl)phenyl)benzenesulfonamide |
| Production Example 7 (YE-07) | (E)-4-chloro-N-(3-(3-(4-methoxyphenyl)acryloyl)phenyl)benzenesulfonamide |
| Production Example 8 (YE-08) | (E)-4-chloro-N-(3-(3-(2,5-dimethoxyphenyl)acryloyl)phenyl)benzenesulfonamide |
| Production Example 9 (YE-09) | (E)-4-chloro-N-((4-chlorophenyl)sulfonyl)-N-(3-(3-(2,5-dimethoxyphenyl)acryloyl)phenyl)benzenesulfonamide |
| Production Example 10 (YE-10) | (E)-1-(4-aminophenyl)-3-(4-(piperidin-1-yl)phenyl)prop-2-en-1-one |
| Production Example 11 (YE-11) | (E)-1-(3-aminophenyl)-3-(4-(piperidin-1-yl)phenyl)prop-2-en-1-one |
| Production Example 12 (YE-12) | (E)-1-(4-hydroxyphenyl)-3-(4-(piperidin-1-yl)phenyl)prop-2-en-1-one |
| Production Example 13 (YE-13) | (E)-1-(2,4-dihydroxyphenyl)-3-(4-(piperidin-1-yl)phenyl)prop-2-en-1-one |
| Production Example 14 (YE-14) | (E)-3-(4-hydroxy-2-methoxyphenyl)-1-(4-(piperazin-1-yl)phenyl)prop-2-en-1-one |
| Production Example 15 (YE-15) | (E)-3-(4-hydroxyphenyl)-1-(4-(4-methylpiperazin-1-yl)phenyl)prop-2-en-1-one |

[Method 1]

Method including steps of: adding an acetophenone derivative (1 equivalent), a benzaldehyde derivative (1 equivalent) and NaOH (1 equivalent) to an ethanol solvent, followed by stirring at room temperature; after completion of the reaction, adding water to the reaction mixture, followed by extraction with ethyl acetate; and collecting the organic solvent layer, washing the collected material once with water, drying the washed material with anhydrous $MgSO_4$, removing the solvent by distillation under reduced pressure, and purifying the residue by silica gel chromatography.

[Method 2]

Method including steps of: adding an acetophenone derivative (1 equivalent), a 4-((tetrahydro-2H-pyran-2-yl)oxy)benzaldehyde derivative (1 equivalent) and NaOH (1 equivalent) to an ethanol solvent, followed by stirring at room temperature; after completion of the reaction, adding 4 M HCl to the mixture, followed by stirring for 20 minutes, addition of water, and extraction with ethyl acetate; and collecting the organic solvent layer, washing the collected material once with water, drying the washed material with anhydrous MgSO$_4$, removing the solvent by distillation under reduced pressure, and purifying the residue by silica gel chromatography.

[Production Example 1] (E)-1-(4-aminophenyl)-3-(2,4-dimethoxyphenyl)prop-2-en-1-one (YE-01)

According to Method 1 above, 4-aminoacetophenone (0.30 g, 2.22 mmol), 2,4-dimethoxybenzaldehyde (0.37 g, 2.22 mmol) and NaOH (0.09 g, 2.22 mmol) were used as starting materials. The residue was purified by silica gel chromatography (developing solvent: ethyl acetate/n-hexane=1:2→1:1) to obtain the compound of Production Example 1 (0.15 g, 23.0% yield) as a yellow solid. R$_f$ 0.33 (ethyl acetate/n-hexane=1:1); $^1$H-NMR (400 MHz, CDCl$_3$) δ 3.85 (s, 3H), 3.89 (s, 3H), 6.47 (d, J=2.0 Hz, 1H), 6.52 (dd, J=8.4, 2.4 Hz, 1H), 6.69 (d, J=8.4 Hz, 2H), 7.55 (d, J=15.6 Hz, 1H), 7.56 (d, J=8.8 Hz, 1H), 7.92 (d, J=8.4 Hz, 2H), 8.02 (d, J=15.6 Hz, 1H); $^{13}$C-NMR (100 MHz, CDCl$_3$) 55.6, 55.7, 98.7, 105.5, 114.1, 117.8, 120.7, 129.4, 130.8, 131.1, 139.0, 150.9, 160.4, 162.8, 189.1 ppm.

[Production Example 2] (E)-1-(4-aminophenyl)-3-(2,5-dimethoxyphenyl)prop-2-en-1-one (YE-02)

According to Method 1 above, 4-aminoacetophenone (0.50 g, 3.70 mmol), 2,5-dimethoxybenzaldehyde (0.62 g, 3.70 mmol) and NaOH (0.15 g, 3.70 mmol) were used as starting materials. The residue was purified by silica gel chromatography (developing solvent: ethyl acetate/n-hexane=1:2→1:1) to obtain the compound of Production Example 2 (0.66 g, 62.5% yield) as a yellow solid. R$_f$ 0.36 (ethyl acetate/n-hexane=1:1); $^1$H-NMR (400 MHz, CDCl$_3$) δ 3.81 (s, 3H), 3.85 (s, 3H), 4.19 (br s, 2H), 6.69 (d, J=8.8 Hz, 2H), 6.86 (d, J=8.8 Hz, 1H), 6.91 (dd, J=8.8, 2.8 Hz, 1H), 7.16 (d, J=2.8 Hz, 1H), 7.58 (d, J=15.6 Hz, 1H), 7.92 (d, J=8.8 Hz, 2H), 8.04 (d, J=15.6 Hz, 1H); $^{13}$C-NMR (100 MHz, CDCl$_3$) 56.0, 56.3, 112.7, 113.9, 114.1, 116.8, 123.3, 125.2, 128.9, 131.3, 138.6, 151.2, 153.4, 153.7, 188.8 ppm.

[Production Example 3] (E)-1-(3-aminophenyl)-3-(4-methoxyphenyl)prop-2-en-1-one (YE-03)

According to Method 1 above, 3-aminoacetophenone (1.00 g, 7.40 mmol), 4-methoxybenzaldehyde (1.00 g, 7.40 mmol) and NaOH (0.30 g, 7.40 mmol) were used as starting materials. The residue was purified by silica gel chromatography (developing solvent: (ethyl acetate/n-hexane=1:2→1:1) to obtain the compound of Production Example 3 (0.83 g, 62.5% yield) as an orange solid. R$_f$ 0.40 (ethyl acetate/n-hexane=1:1); $^1$H-NMR (400 MHz, CDCl$_3$) δ 3.83 (br s, 2H), 3.85 (s, 3H), 6.88 (ddd, J=8.0, 2.4, 0.8 Hz, 1H), 6.93 (d, J=8.8 Hz, 2H), 7.27 (dd, J=8.0, 7.6 Hz, 1H), 7.31 (dd, J=2.0, 1.6 Hz, 1H), 7.36 (d, J=15.6 Hz, 1H), 7.38 (ddd, J=7.6, 1.6, 0.8 Hz, 1H), 7.59 (d, J=8.8 Hz, 2H), 7.76 (d, J=15.6 Hz, 1H); $^{13}$C-NMR (100 MHz, CDCl$_3$) 56.0, 56.3, 112.7, 113.9, 114.1, 116.8, 123.3, 125.2, 128.9, 131.3, 138.6, 151.2, 153.4, 153.7, 188.8 ppm.

[Production Example 4] (E)-1-(3-aminophenyl)-3-(4-hydroxy-2-methoxyphenyl)prop-2-en-1-one (YE-04)

According to Method 2 above, 3-aminoacetophenone (0.40 g, 2.96 mmol), 2-methoxy-4-((tetrahydro-2H-pyran-2-yl)oxy)benzaldehyde (0.70 g, 2.96 mmol) and NaOH (0.12 g, 2.96 mmol) were used as starting materials. The residue was purified by silica gel chromatography (developing solvent: ethyl acetate/n-hexane=1:1) to obtain the compound of Production Example 4 (0.28 g, 35.1% yield) as an orange solid. R$_f$ 0.25 (ethyl acetate/n-hexane=1:1); $^1$H-NMR (400 MHz, CDCl$_3$) δ 3.71 (s, 3H), 6.30 (d, J=2.4 Hz, 1H), 6.34 (dd, J=8.4, 2.0 Hz, 1H), 6.72 (ddd, J=8.0, 2.4, 0.8 Hz, 1H), 7.08 (dd, J=8.4, 8.0 Hz, 1H), 7.13 (d, J=2.4 Hz, 1H), 7.16 (ddd, J=7.6, 7.6, 0.8 Hz, 1H), 7.29 (d, J=15.6 Hz, 1H), 7.32 (d, J=8.4 Hz, 1H), 7.85 (d, J=15.6 Hz, 1H), 9.35 (br s, 1H); $^{13}$C-NMR (100 MHz, CDCl$_3$) 55.3, 99.1, 108.2, 114.1, 115.3, 118.1, 118.7, 119.3, 129.1, 130.6, 139.8, 140.3, 147.0, 60.5, 161.4, 191.1 ppm.

[Production Example 5] (E)-1-(3-Aminophenyl)-3-(2,5-dimethoxyphenyl)prop-2-en-1-one (YE-05)

According to Method 1 above, 4-aminoacetophenone (0.50 g, 3.70 mmol), 2,5-dimethoxybenzaldehyde (0.62 g, 3.70 mmol) and NaOH (0.15 g, 3.70 mmol) were used as starting materials. The residue was purified by silica gel chromatography (developing solvent: ethyl acetate/n-hexane=1:3) to obtain the compound of Production Example 5 (0.27 g, 25.4% yield) as a yellow solid. R$_f$ 0.62 (ethyl acetate/n-hexane=1:1); $^1$H-NMR (400 MHz, CDCl$_3$) δ 3.81 (s, 3H), 3.86 (s, 3H), 6.87 (d, J=8.8 Hz, 1H), 6.88 (ddd, J=8.4, 2.0, 0.8 Hz, 1H), 6.94 (dd, J=8.8, 2.8 Hz, 1H), 7.16 (d, J=2.8 Hz, 1H), 7.27 (dd, J=8.0, 8.0 Hz, 1H), 7.31 (dd, J=2.8, 2.8 Hz, 1H), 7.38 (ddd, J=8.0, 2.0, 1.6 Hz, 1H), 7.53 (d, J=15.6 Hz, 1H), 8.06 (d, J=15.6 Hz, 1H); $^{13}$C-NMR (100 MHz, CDCl$_3$) 56.1, 56.3, 112.7, 113.9, 114.7, 117.4, 119.1, 119.4, 123.6, 124.8, 129.6, 139.8, 140.0, 147.0, 153.5, 153.7, 191.4 ppm.

[Production Example 6] (E)-4-chloro-N-(4-(3-(2,5-dimethoxyphenyl)acryloyl)phenyl)benzenesulfonamide (YE-06)

To a solution of the compound of Production Example 2 (0.67 g, 2.36 mmol) and triethylamine (TEA, 0.26 g, 2.60 mmol) in CH$_2$Cl$_2$, 4-chlorobenzenesulfonyl chloride (0.75 g, 3.54 mmol) was added, and the mixture was stirred at room temperature for 24 hours. Water was added to the reaction mixture which was then extracted with ethyl acetate. The organic solvent layer was collected, washed with saturated NaHCO$_3$, and dried with anhydrous MgSO$_4$. Then, the solvent was removed by distillation under reduced pressure, and the residue was purified by silica gel chromatography (developing solvent: ethyl acetate/n-hexane=1:2) to obtain the compound of Production Example 6 (0.55 g, 50.9% yellow) as a yellow solid. R$_f$ 0.18 (ethyl acetate/n-hexane=1:1); $^1$H-NMR (400 MHz, DMSO-d6) δ 3.74 (s, 3H), 3.80 (s, 3H), 6.84 (d, J=8.8 Hz, 1H), 6.88 (dd, J=8.8, 2.4 Hz, 1H), 7.16 (d, J=2.4 Hz, 1H), 7.20 (d, J=8.4 Hz, 2H), 7.40 (d, J=8.4 Hz, 2H), 7.54 (d, J=15.6 Hz, 1H), 7.74 (d, J=8.4 Hz, 2H), 7.85 (d, J=8.4 Hz, 2H), 7.91 (d, J=15.6 Hz, 1H), 10.58 (s, 1H); $^{13}$C-NMR (100 MHz, DMSO-d6) 55.2, 55.6, 112.1, 112.7, 117.0, 118.0, 121.6, 123.5, 128.0, 128.1, 128.7, 129.4, 132.9, 137.8, 138.3, 141.5, 152.5, 152.9, 187.9 ppm.

[Production Example 7] (E)-4-chloro-N-(3-(3-(4-methoxyphenyl)acryloyl)phenyl)benzenesulfonamide (YE-07)

N-(3-acetylphenyl)-4-chlorobenzenesulfonamide (0.10 g, 0.32 mmol), 4-methoxybenzaldehyde (0.04 g, 0.32 mmol) and NaOH (0.03 g, 0.80 mmol) were added to an ethanol solvent, followed by stirring at room temperature for 72 hours. A dilute aqueous hydrochloric acid solution was added to the reaction mixture which was then extracted with ethyl acetate. The organic solvent layer was collected, washed with water, and dried with anhydrous MgSO$_4$. The solvent was removed by distillation under reduced pressure, and the residue was purified by silica gel chromatography (developing solvent: ethyl acetate/n-hexane=1:3→1:1) to obtain the compound of Production Example 7 (0.01 g, 6.5% yield) as a yellow solid. $^1$H-NMR (400 MHz, CDCl$_3$) δ 3.84 (s, 3H), 6.92 (d, J=8.8 Hz, 2H), 7.28 (d, J=15.6 Hz, 1H), 7.33 (dd, J=8.0, 7.6 Hz, 1H), 7.36 (d, J=8.8 Hz, 2H), 7.41 (ddd, J=8.0, 2.0, 1.2 Hz, 1H), 7.57 (d, J=8.8 Hz, 2H), 7.68 (ddd, J=7.6, 1.6, 1.2 Hz, 1H), 7.71-7.78 (m, 4H), 9.25 (s, 1H); $^{13}$C-NMR (100 MHz, CDCl$_3$) 55.6, 114.6, 119.5, 121.1, 124.9, 125.0, 127.6, 128.8, 129.4, 129.7, 130.5, 137.

[Production Example 8] (E)-4-chloro-N-(3-(3-(2,5-dimethoxyphenyl)acryloyl)phenyl)benzenesulfonamide (YE-08)

To a solution of the compound of Production Example 5 (0.12 g, 0.43 mmol) and triethylamine (0.03 g, 2.60 mmol) in CH$_2$Cl$_2$, 4-chlorobenzenesulfonyl chloride (0.09 g, 0.43 mmol) was added, and the mixture was stirred at room temperature for 24 hours. Water was added to the reaction mixture which was then extracted with ethyl acetate. The organic solvent layer was collected, washed with saturated NaHCO$_3$, and dried with anhydrous MgSO$_4$. Then, the solvent was removed by distillation under reduced pressure, and the residue was purified by silica gel chromatography (developing solvent: ethyl acetate/n-hexane=1:3) to obtain the compound of Production Example 8 (0.08 g, 37.3% yield) as a yellow solid. R$_f$ 0.33 (ethyl acetate/n-hexane=1:1); $^1$H-NMR (400 MHz, CDCl$_3$) δ 3.82 (s, 3H), 3.88 (s, 3H), 6.88 (d, J=8.8 Hz, 1H), 6.96 (dd, J=8.4, 2.8 Hz, 1H), 7.15 (d, J=2.8 Hz, 1H), 7.40 (d, J=8.8 Hz, 2H), 7.41-7.43 (m, 2H), 7.55 (d, J=16.0 Hz, 1H), 7.73 (d, J=8.8 Hz, 2H), 7.71-7.72 (m, 1H), 7.76-7.79 (m, 1H), 8.08 (d, J=16.0 Hz, 1H); $^{13}$C-NMR (100 MHz, CDCl$_3$) 56.1, 56.3, 112.7, 114.5, 117.9, 121.6, 122.8, 124.4, 125.5, 125.8, 128.9, 129.7, 130.0, 137.1, 137.7, 139.9, 140.0, 141.6, 153.7, 153.8, 190.3 ppm.

[Production Example 9] (E)-4-chloro-N-((4-chlorophenyl)sulfonyl)-N-(3-(3-(2,5-dimethoxyphenyl)acryloyl)phenyl)benzenesulfonamide (YE-09)

To a solution of the compound of Production Example 5 (0.22 g, 0.78 mmol) and trimethylamine (0.22 g, 2.12 mmol) in CH$_2$Cl$_2$, 4-chlorobenzenesulfonyl chloride (0.25 g, 1.17 mmol) was added, and the mixture was stirred at room temperature for 24 hours. Water was added to the reaction mixture which was then extracted with ethyl acetate. The organic solvent layer was collected, washed with saturated NaHCO$_3$, and dried with anhydrous MgSO$_4$. Then, the solvent was removed by distillation under reduced pressure, and the residue was purified by silica gel chromatography (developing solvent: ethyl acetate/n-hexane=1:4) to obtain the compound of Production Example 8 (0.20 g, 39.8% yield) as a yellow solid. R$_f$ 0.77 (ethyl acetate/n-hexane=1:1); $^1$H-NMR (400 MHz, CDCl$_3$) δ 3.83 (s, 3H), 3.86 (s, 3H), 6.89 (d, J=9.2 Hz, 1H), 6.97 (dd, J=9.2, 3.2 Hz, 1H), 7.13 (d, J=2.8 Hz, 1H), 7.19 (dd, J=8.4, 2.0 Hz, 1H), 7.42 (d, J=16.0 Hz, 1H), 7.52 (d, J=8.4 Hz, 1H), 7.54 (d, J=8.8 Hz, 4H), 7.66 (dd, J=1.6, 1.6 Hz, 1H), 7.89 (d, J=8.8 Hz, 4H), 8.05 (d, J=16.0 Hz, 1H), 8.09 (d, J=8.0 Hz, 1H); $^{13}$C-NMR (100 MHz, CDCl$_3$) 56.1, 56.3, 112.7, 114.3, 117.9, 122.9, 124.3, 129.8, 129.9, 130.3, 130.6, 131.6, 134.6, 135.2, 137.8, 140.2, 141.4, 141.8, 153.7, 153.8, 189.9 ppm.

[Production Example 10] (E)-1-(4-aminophenyl)-3-(4-(piperidin-1-yl)phenyl)prop-2-en-1-one (YE-10)

According to Method 1 above, 4-aminoacetophenone (0.40 g, 2.96 mmol), 4-(piperidin-1-yl)benzaldehyde (0.56 g, 2.96 mmol) and NaOH (0.12 g, 2.96 mmol) were used as starting materials. The residue was purified by silica gel chromatography (developing solvent: MeOH:CHCl$_3$=1:19) to obtain the compound of Production Example 10 (0.28 g, 30.9% yield) as an orange solid. R$_f$ 00.43 (ethyl acetate/n-hexane=1:1); $^1$H-NMR (400 MHz, CDCl$_3$) δ 1.62-1.71 (m, 6H), 3.29 (t, J=5.2 Hz, 4H), 4.10 (br s, 2H), 6.69 (d, J=8.8 Hz, 2H), 6.89 (d, J=8.8 Hz, 2H), 7.37 (d, J=15.6 Hz, 1H), 7.53 (d, J=8.8 Hz, 2H), 7.75 (d, J=15.6 Hz, 1H), 7.95 (d, J=8.8 Hz, 2H).

[Production Example 11] (E)-1-(3-aminophenyl)-3-(4-(piperidin-1-yl)phenyl)prop-2-en-1-one (YE-11)

According to Method 1 above, 3-aminoacetophenone (0.40 g, 2.96 mmol), 4-(piperidin-1-yl)benzaldehyde (0.56 g, 2.96 mmol) and NaOH (0.12 g, 2.96 mmol) were used as starting materials. The residue was purified by silica gel chromatography (developing solvent: MeOH:CHCl$_3$=1:19) to obtain the compound of Production Example 11 (0.45 g, 49.6% yield) as an orange solid. R$_f$ 0.47 (ethyl acetate/n-hexane=1:1); $^1$H-NMR (400 MHz, CDCl$_3$) δ 1.61-1.72 (m, 6H), 3.31 (t, J=5.6 Hz, 4H), 3.80 (br s, 2H), 6.86 (ddd, J=8.0, 2.4, 0.8 Hz, 1H), 6.89 (d, J=8.8 Hz, 2H), 7.28 (dd, J=8.0, 8.0 Hz, 1H), 7.30 (d, J=15.6 Hz, 1H), 7.31 (dd, J=2.0, 2.0 Hz, 1H), 7.37 (ddd, J=8.8, 1.2, 1.2 Hz, 1H), 7.53 (d, J=8.8 Hz, 2H), 7.75 (d, J=15.6 Hz, 1H); $^{13}$C-NMR (100 MHz, CDCl$_3$) 24.6, 25.7, 49.3, 114.7, 115.0, 118.4, 119.0, 119.1, 124.7, 129.5, 130.4, 140.3, 145.4, 146.9, 153.4, 191.1 ppm.

[Production Example 12] (E)-1-(4-Hydroxyphenyl)-3-(4-(piperidin-1-yl)phenyl)prop-2-en-1-one (YE-12)

According to Method 2 above, 1-(4-((tetrahydro-2H-pyran-2-yl)oxy)phenyl)ethan-1-one (0.50 g, 2.27 mmol), 4-(piperidin-1-yl)benzaldehyde (0.43 g, 2.27 mmol) and NaOH (0.09 g, 2.27 mmol) were used as starting materials. The residue was purified by silica gel chromatography (developing solvent: ethyl acetate/n-hexane=1:3→1:1) to obtain the compound of Production Example 12 (0.24 g, 33.7% yield) as an orange solid. R$_f$ 0.17 (ethyl acetate/n-hexane=1:3); $^1$H-NMR (400 MHz, CDCl$_3$) δ 1.58-1.65 (m, 6H), 3.25 (t, J=5.6 Hz, 4H), 6.84 (d, J=8.8 Hz, 2H), 6.87 (d, J=8.8 Hz, 2H), 7.32 (d, J=15.6 Hz, 1H), 7.48 (d, J=8.8 Hz, 2H), 7.68 (d, J=15.6 Hz, 1H), 7.90 (d, J=8.8 Hz, 2H), 9.34

(s, 1H); $^{13}$C-NMR (100 MHz, CDCl$_3$) 24.4, 25.5, 49.2, 114.9, 115.6, 117.8, 124.8, 130.1, 130.6, 130.9, 144.2, 153.1, 161.7, 189.0 ppm.

[Production Example 13] (E)-1-(2,4-Dihydroxyphenyl)-3-(4-(piperidin-1-yl)phenyl)prop-2-en-1-one (YE-13)

According to Method 2 above, 1-(4-((tetrahydro-2H-pyran-2-yl)oxy)phenyl)ethan-1-one (0.50 g, 2.12 mmol), 4-(piperidin-1-yl)benzaldehyde (0.40 g, 2.12 mmol) and Ba(OH)$_2$·8H$_2$O (0.73 g, 2.33 mmol) were used as starting materials. The residue was purified by silica gel chromatography (developing solvent: ethyl acetate/n-hexane=1:1) to obtain the compound of Production Example 13 (0.12 g, 16.8% yield) as an orange solid. R$_f$ 0.66 (ethyl acetate/n-hexane=1:1); $^1$H-NMR (400 MHz, CDCl$_3$) δ 1.58-1.65 (m, 6H), 3.27 (t, J=5.6 Hz, 4H), 6.37-6.40 (m, 2H), 6.84 (d, J=8.8 Hz, 2H), 7.34 (d, J=15.2 Hz, 1H), 7.49 (d, J=8.8 Hz, 2H), 7.73 (d, J=8.4 Hz, 1H), 7.76 (d, J=15.2 Hz, 1H), 9.64 (s, 1H), 13.6 (s, 1H).

[Production Example 14] (E)-3-(4-Hydroxy-2-methoxyphenyl)-1-(4-(piperazin-1-yl)phenyl)prop-2-en-1-one (YE-14)

According to Method 2 above, 1-(4-((tetrahydro-2H-pyran-2-yl)oxy)phenyl)ethan-1-one (0.50 g, 2.45 mmol), 2-methoxy-4-((tetrahydro-2H-pyran-2-yl)oxy)benzaldehyde (0.58 g, 2.45 mmol) and NaOH (0.20 g, 4.90 mmol) were used as starting materials. After removal of the solvent, the resulting solid was treated with a mixed solvent of ethyl acetate/n-hexane. The resulting solid was filtered and dried in a vacuum to obtain the compound of Production Example 14 (0.28 g, 33.8% yield) as an orange solid. $^1$H-NMR (400 MHz, DMSO-d6) δ 2.89 (dd, J=7.2, 3.2 Hz, 4H), 3.26 (dd, J=7.2, 4.0 Hz, 4H), 3.82 (s, 3H), 6.40 (dd, J=8.8, 2.0 Hz, 1H), 6.41 (d, J=1.6 Hz, 1H), 6.89 (d, J=8.8 Hz, 2H), 7.51 (d, J=15.6 Hz, 1H), 7.55 (d, J=8.8 Hz, 1H), 7.87 (d, J=15.6 Hz, 1H), 7.90 (d, J=8.8 Hz, 2H); $^{13}$C-NMR (100 MHz, DMSO-d6) 45.1, 47.5, 55.1, 98.7, 107.9, 112.9, 114.7, 118.0, 127.7, 129.7, 129.8, 137.7, 153.7, 159.7, 161.2, 186.8 ppm.

[Production Example 15] (E)-3-(4-Hydroxyphenyl)-1-(4-(4-methylpiperazin-1-yl)phenyl)prop-2-en-1-one (YE-15)

According to Method 2 above, 1-(4-((tetrahydro-2H-pyran-2-yl)oxy)phenyl)ethan-1-one (0.50 g, 2.29 mmol), 4-((tetrahydro-2H-pyran-2-yl)oxy)benzaldehyde (0.47 g, 2.29 mmol) and NaOH (0.09 g, 2.29 mmol) were used as starting materials. After removal of the solvent, the resulting solid was treated with a mixed solvent of ethyl acetate/n-hexane. The resulting solid was filtered and dried in a vacuum to obtain the compound of Production Example 15 (0.70 g, 94.8% yield) as an orange solid. $^1$H-NMR (400 MHz, CDCl$_3$) δ 2.33 (s, 3H), 2.55 (t, J=5.2 Hz, 4H), 3.37 (t, J=5.2 Hz, 4H), 6.86 (d, J=8.8 Hz, 2H), 6.89 (d, J=8.8 Hz, 2H), 7.38 (d, J=15.6 Hz, 1H), 7.49 (d, J=8.8 Hz, 2H), 7.72 (d, J=15.6 Hz, 1H), 7.95 (d, J=8.8 Hz, 2H); $^{13}$C-NMR (100 MHz, CDCl$_3$) 46.2, 47.4, 54.8, 113.7, 116.2, 118.8, 126.8, 128.7, 130.3, 130.6, 143.7, 154.0, 159.7, 188.4 ppm.

[Experimental Methods]
[Experimental Method 1] Test Cell Lines and Cell Line Culture Method Human cell lines (VERO, HFL-1, L929, NIH 3T3 and CHO-K1) were used to evaluate the cytotoxicity of the compound of Production Example 6 according to the present disclosure. In addition, in order to evaluate the abilities of the compound of Production Example 6 according to the present disclosure and 13 compounds, including the compounds of Production Examples 1 to 5 and 8 to 15 having a similar structure (YE-01, 02, 03, 04, 05, 08, 09, 10, 11, 12, 13, 14 and 15), to inhibit the growth of cancer cell lines, the following cell lines were used: human gastric cancer cell lines (NCI-N87, and SNU-216), human brain cancer cell lines (U-87 MG, and Hs 683), human pancreatic cell lines (AsPC-1, and MIA PaCa-2), human breast cancer cell lines (BT549, MDA-MB-231 and Hs578t), and a mouse breast cancer cell line 4T1 or 4T1-luc (a cell line constructed so that luciferase can be expressed in 4T1 cell line and the location of the cell can be visually confirmed by simple pretreatment).

Each of the cell lines was provided from ATCC (American Type Culture Collection), JCRB Cell Bank (Japanese Collection of Research Bioresources Cell Bank) or Korea Cell Line Bank (KCRB). Each of the cell lines was cultured according to the culture medium and culture conditions described on the ATCC official website. In addition, in order to prevent mycoplasma infection which may affect gene expression in the cell line, whether or not mycoplasma infection would occur was regularly checked during culture of the cell line, and when mycoplasma infection was confirmed, it was treated with an anti-mycoplasma antibiotic for 1 to 2 weeks. Here, the 4T1-luc cell line was used for the construction of xenogeneic/orthotopic animal models.

[Experimental Method 2] Conditions for Treating Cell Lines with Compound of Production Example 6

The compound of Production Example 6 was dissolved in DMSO at a concentration of 1 to 50 µM. Thereafter, for each breast cancer cell line of Experimental Method 1, the concentration and time at which the compound of Preparation Example 6 showed optimal activity and a clear tendency were examined. At this time, a control group for treatment with the compound of Preparation Example 6 was treated with only DMSO. In order not to cause interference such as inhibition of cell activity, treatment with DMSO was performed such that DMSO did not exceed 5% of the total medium.

[Experimental Method 3] Method for Measuring the Ability to Stabilize and Activate AMPK (AMP-Activated Protein Kinase)

In order to examine whether or not the compound of Production Example 6 and 13 compounds, including the compounds of Production Examples 1 to 5 and 8 to 15 having a similar structure (YE-01, 02, 03, 04, 05, 08, 09, 10, 11, 12, 13, 14 and 15), bind to the AMP binding site of AMPK, cellular thermal shift assay (CTSA) was performed. Specifically, the cultured human breast cancer-derived cell line (BT549 or MDA-MB-231 cell line) was detached from the culture dish using trypsin. The detached cell line was diluted in PBS, and the same amount of the cells were dispensed in each tube for PCR and heated for 3 minutes at a temperature of room temperature to 65° C. After completion of the heating, protein was isolated from the cell line using liquid nitrogen, and Western blot analysis was performed to confirm the temperature at which AMPK would be denatured by heat.

[3-1] The breast cancer cell line of Experimental Method 1 above was treated with the compound of Production Example 6 at a concentration of 0 to 30 µM, and then cultured for 24 hours. Thereafter, the cells were harvested and lysed in RIPA buffer, and the protein was electrophoresed by SDS-PAGE, and then the expression level of the protein was analyzed using antibodies specific for AMPK and phospho-AMPK (Thr172). GAPDH or β-actin was used as a loading control for protein quantification.

[3-2] The three breast cancer cell lines (4T1, BT549, and MDA-MB-231) of Experimental Method 1 were treated with each of the compound of Production Example 6 and 13 compounds, including the compounds of Production Examples 1 to 5 and 8 to 15 having a similar structure (YE-01, 02, 03, 04, 05, 08, 09, 10, 11, 12, 13, 14 and 15), at a concentration of 10 μM, and then cultured for 24 hours. In addition, each of two types of gastric cancer cell lines, brain cancer cell lines and pancreatic cancer cell lines was treated with the compound of Production Example 6 or the compound of Production Example 8 having a similar structure at a concentration of 10 μM and then cultured for 12 hours. Thereafter, the cells were harvested and lysed in RIPA buffer, and the protein was electrophoresed by SDS-PAGE, and then the expression level of the protein was analyzed using antibodies specific for AMPK and phospho-AMPK (Thr172). GAPDH or β-actin was used as a loading control for protein quantification.

[Experimental Method 4] Methods for Measuring Growth Inhibition and Apoptosis Levels of Cancer Cell Lines

[4-1] Cell Viability Assay

[4-1-1] The breast cancer cell line of Experimental Method 1 was treated with 5-aminoimidazole-4-carboxamide ribonucleotide (AICAR) (which is not the compound of Production Example 6) or the compound of Production Example 6 at a concentration of 0 to 30 μM, and then cultured for 24 hours, 48 hours and 72 hours. Thereafter, the cultured cells were treated with WST-1 reagent, and then the absorbance at a wavelength of 450 nm was measured. Here, the WST-1 reagent allows the cell viability to be measured by changing the color of the culture medium depending on the level of the mitochondrial dehydrogenase present in the cell.

[4-1-2] The breast cancer cell line 4T1, BT549 or MDA-MB-231 of Experimental Method 1 was treated with each of the compound of Production Example 6 and 13 compounds, including the compounds of Production Examples 1 to 5 and 8 to 15 having a similar structure (YE-01, 02, 03, 04, 05, 08, 09, 10, 11, 12, 13, 14 and 15), at a concentration of 0 to 50 μM, and then cultured for 24 hours. Each of three types of gastric cancer cell lines, brain cancer cell lines and pancreatic cancer cell lines was treated with the compound of Production Example 6 or the compound of Production Example 8 having a similar structure at a concentration of 0 to 50 μM, and then cultured for 24 hours. Thereafter, the cultured cells were treated with WST-1 reagent according to the manufacturer's instruction, and after a certain time, the absorbance at a wavelength of 450 nm was measured. Here, the WST-1 reagent allows the cell viability to be measured by changing the color of the culture medium depending on the level of the mitochondrial dehydrogenase present in the cell.

[4-2] Clonogenic Assay

The breast cancer cell line of Experimental Method 1 was dispensed into a 6-well plate at a density of 1 to $2\times10^3$ cells/well. After the cells were sufficiently attached, they were treated with the compound of Production Example 6 at a concentration of 0 to 30 μM and cultured for 10 days to 14 days. Next, the cultured cells were fixed with 4% formaldehyde and stained with 1% crystal violet, and the colonies were counted under a microscope.

[4-3] Flow Cytometry Assay

The breast cancer cell line of Experimental Method 1 was treated with the compound of Production Example 6 at a concentration of 0 to 30 μM and cultured for 24 hours. Thereafter, the cultured cells were detached by trypsin, and then double-stained with Annexin V; recognizing apoptosis) and PI (propidium iodide; recognizing cell necrosis), and then the pattern and level of apoptosis were measured using flow cytometry.

[Experimental Method 5] Method for Measurement of Epithelial-Mesenchymal Transition (EMT) in Cancer Cell Line The culture medium of the breast cancer cell line of Experimental Method 1 was replaced with a serum-free medium. Then, the cells were treated with 2 ng/mL of TGF-β1 and the compound of Preparation Example 6 and cultured for 20 to 24 hours. Thereafter, as described in Experimental Method 3, the expression level of the protein was measured using an antibody specific for the EMT-related protein.

[Experimental Method 6] Construction of Breast Cancer Cell Line Xenograft/Orthotopic Animal Models After 4-week-old athymic nude mice (female) were purchased, only healthy mice were selected while the mice were adapted to the environment of the animal breeding room for 7 days. For identification of each mouse, the ears were marked using an ear punch. In addition, the breeding box was identified by attaching a mouse identification card describing the test number, test substance name, test item, receipt date, test date, test content, and the person in charge of the test. The environment of the animal breeding room was maintained at a temperature of 22±3° C., a relative humidity of 50±20%, 10 to 15 ventilations/hour, a 12-hour light (8:30 to 20:30)/dark cycle, and an illuminance of 150 to 300 lux. In addition, the animals were fed feed and drinking water during the breeding period, and quarantined during the acclimatization and testing periods.

The nude mice were anesthetized by inhalation with 2.5% isoflurane, and then injected with the mouse breast cancer cell line 4T1-luc of Experimental Method 1 by a sterile syringe. The cells were diluted in 100 μl of PBS (phosphate buffer saline) so that 1 to $2.5\times10^6$ cells could be injected per nude mouse, and then the dilution was injected into the flank or mammary fat pad. The constitution of the xenograft animal model obtained by injecting the breast cancer cell line into the flank is shown in Table 2 below. In addition, the constitution of the orthotopic animal model obtained by injecting the breast cancer cell line into the mammary gland pad is shown in Table 3 below.

TABLE 2

| | Treatment content for each group | Efficacy test substance | Drug administration route | Number of mice | Experimental purpose |
|---|---|---|---|---|---|
| Control group | 4T1-luc xenograft (flank, s.c.) | Saline | Tail vein injection (IV) | 4 | Confirmation of tumor regression ability |

TABLE 2-continued

|  | Treatment content for each group | Efficacy test substance | Drug administration route | Number of mice | Experimental purpose |
|---|---|---|---|---|---|
| Experimental group | 4T1-luc xenograft (flank, s.c.) | Production Example 6 (4 mg/kg b.w.) | Tail vein injection (IV) | 4 | Confirmation of tumor regression ability |

TABLE 3

|  | Treatment content for each group | Efficacy test substance | Drug administration route | Number of mice | Experimental purpose |
|---|---|---|---|---|---|
| Control group | 4T1-luc orthotopic graft (fat pad, s.c.) | Saline | Intmperitoneal injection (IP) | 3 | Confirmation of cancer metastasis inhibitory ability |
| Experimental group | 4T1-luc orthotopic graft (fat pad, s.c.) | Production Example 6 (20 mg/kg b.w.) | Intraperitoneal injection (IP) | 3 | Confirmation of cancer metastasis inhibitory ability |
| Control group | 4T1-luc orthotopic graft (fat pad, s.c.) | Saline | Intraperitoneal injection (IP) | 14 | Confirmation of survival rate |
| Experimental group | 4T1-luc orthotopic graft (fat pad, s.c.) | Production Example 6 (20 mg/kg b.w.) | Intraperitoneal injection (IP) | 14 | Confirmation of survival rate |

Meanwhile, after mice with abnormalities, mice that did not gain weight normally, and mice that were not healthy were excluded during the animal acclimatization period, mice were grouped so that the average body weight and tumor size could be uniform.

[Experimental Method 7] Method for Evaluating Effect of Compound of Production Example 6 in Animal Model

[7-1] Methods for Evaluating Effect in Xenograft Animal Model

During a period ranging from the day the mouse breast cancer cell line 4T1-luc was injected to the end of the experiment (dissection date), the tumor volume was measured every day. When the volume of the tumor reached about 80 to 100 mm³, the compound of Production Example 6 was injected into the tail vein of the animal model at a concentration of 4 mg/kg once every 3 days a total of 6 times. In order to confirm the tumor regression effect, the volume of the tumor was measured before administration of the compound of Production Example 6, and at day 28 after the first administration of the compound of Production Example 6, the animals were euthanized, and the primary tumors were excised and their volumes were compared.

[7-2] Method for Evaluating Effect of Improving Survival Rate in Orthotopic Animal Model During a period ranging from the day the mouse breast cancer cell line 4T1-luc was injected to the end of the experiment (the date of death), the volume of the tumor was measured once every 3 days and the survival rate of the animal model was checked every day. When the volume of the tumor reached about 80 to 100 mm³, the compound of Production Example 6 was injected into the abdominal cavity of the animal model at a concentration of 20 mg/kg once every 3 days a total of 6 times. Meanwhile, for the dignity of the animal model, the experiment was terminated at the time point (day 32) when the volume of the primary tumor of the control group reached 3,000 mm³, and the animal model was euthanized.

[7-3] Method for Evaluating Effect in Orthotopic Animal Model

During a period ranging from the day the mouse breast cancer cell line 4T1-luc cell line was injected to the end of the experiment (dissection date), lung metastasis of the cancer cell line was checked at intervals of 1 to 2 days. After the animal model was anesthetized by inhalation with 2.5% isoflurane, luminescence intensity was measured using an in-vivo imaging system (IVIS). Lung metastasis was checked in real time by measuring the location and amount of the 4T1-luc cell line that metastasized to the lung. During a period ranging from the day of the first administration of the compound of Production Example 6 to the end of the experiment, 20 mg/kg of the compound of Production Example 6 was intraperitoneally injected continuously at 2-day intervals.

[Results]

[Example 1] Evaluation of Effect of Increasing Stability of AMPK Protein

Whether the compound of Production Example 6 binds to the AMP binding site of AMPK was examined through the CTSA method described in Experimental Method 3, and the results are shown in FIG. 1.

As shown in FIG. 1, when the AMPK protein was present alone, the level of the protein was reduced from 50° C. ($T_m$ value was 50° C.), whereas when the cells were treated with the compound of Production Example 6, the level of the AMPK protein maintained up to 55° C. ($T_m$ value was 55° C.).

From the above results, it can be seen that the compound according to the present disclosure can increase the heat stability of the AMPK protein by binding to the AMP binding site of AMPK.

[Example 2] Evaluation of Cancer Cell Line Survival and Growth Inhibitory Effects and AMPK Activation Ability

[2-1] Evaluation of Cancer Cell Line Survival and Growth Inhibitory Effects

Figure 2A:
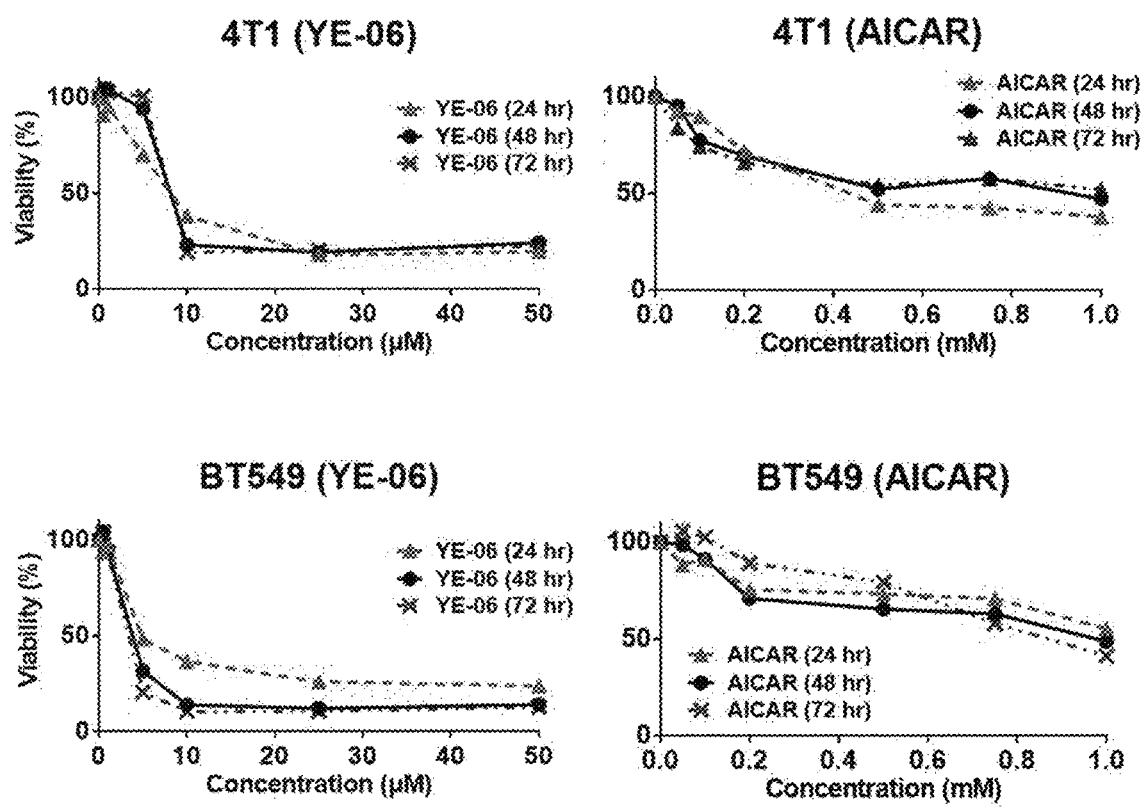
FIGS. 2A and 2B show the results of evaluating, by cell viability assay (a) and clonogenic assay (b), the effect of inhibiting the survival and growth of cancer cell lines in one example of the present disclosure.
Figure 2B:
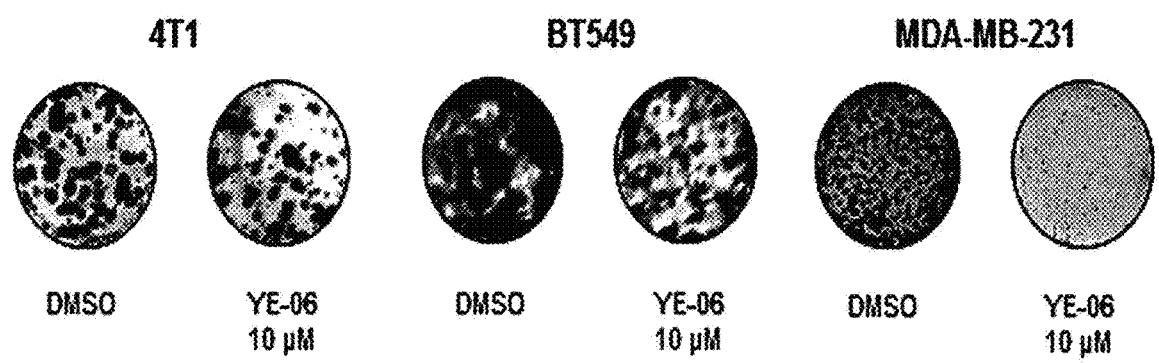

The effects of reducing the survival and inhibiting the growth of cancer cell lines were evaluated by the cell viability assay (a) and clonogenic assay (b) described in Experimental Method 4, and the results are shown in FIGS. 2A and 2B.

As shown in FIGS. 2A and 2B, when the cell lines were treated with the positive control AICAR, the cell viability was inhibited by 50% or more at 1 mM, whereas when both the 4T1 and BT549 cell lines were treated with 10 μM of the compound of Production Example 6, the cell viability was inhibited by 50% or more (see FIG. 2A). Furthermore, when the cell lines were treated with 10 μM of the compound of Production Example 6, colony formation was significantly reduced in all of the 4T1, BT549 and MDA-MB-231 cell lines (see FIG. 2B).

From the above results, it can be seen that the compound according to the present disclosure can reduce the viability of cancer cells and inhibit the growth of cancer cells.

[2-2] Evaluation of Effect of Inhibiting Growth of Cancer Cell Lines

Figure 3A:
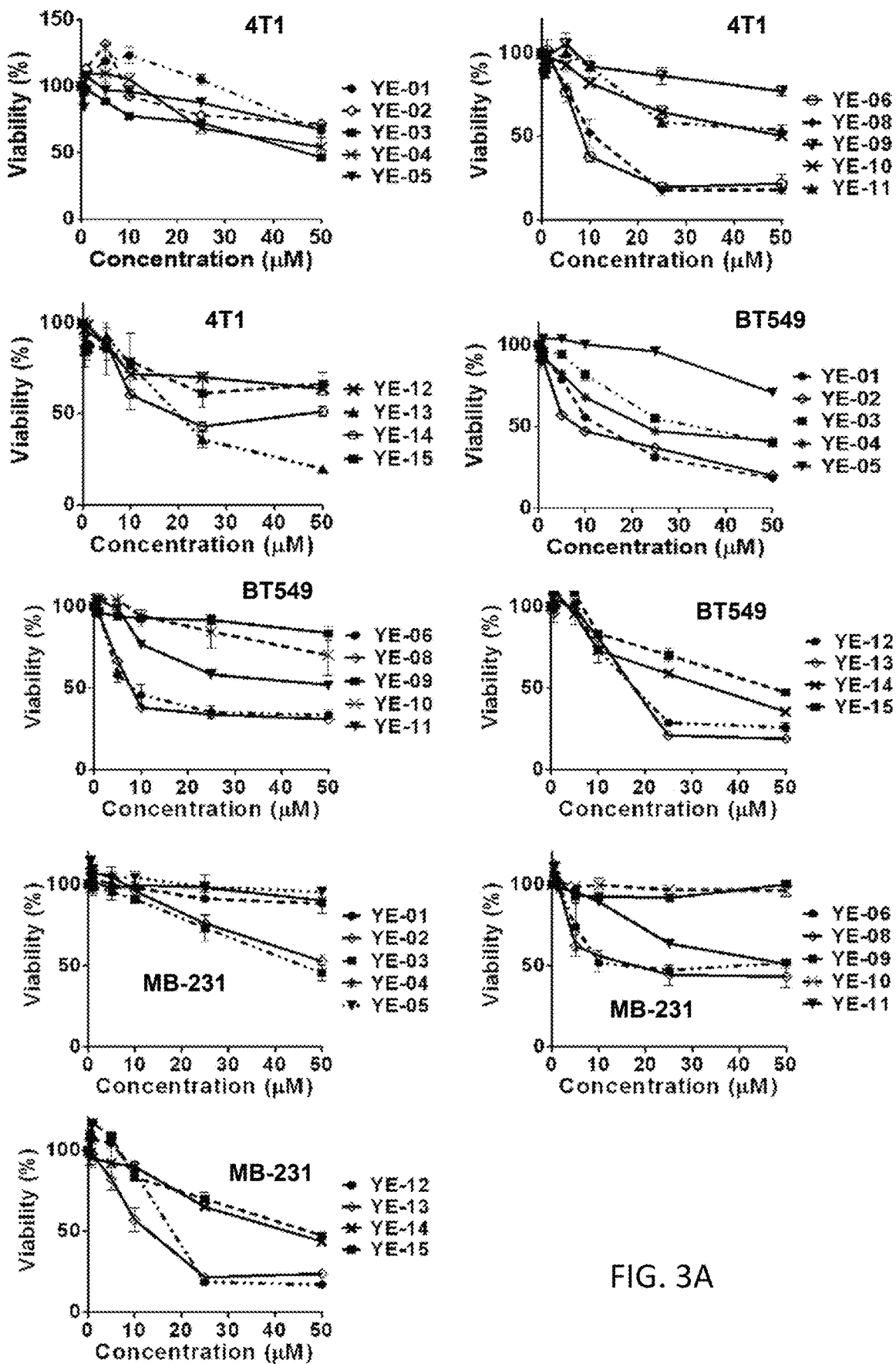
FIG. 3A shows the results of evaluating, by cell viability assay, the effect of inhibiting the survival and growth of cancer cell lines in one example of the present disclosure.

The effect of inhibiting the growth of cancer cells was evaluated through the cell viability assay described in Experimental Method 4-1, and the results are shown in FIGS. 3A, 4A, 4B and 4C. As shown in FIG. 3A, it was confirmed that, when the breast cancer cell lines 4T1, BT549 and MDA-MB-231 were treated with various concentrations of each of a total of 14 compounds, including the compound of Production Example 6 and the compounds of Production Examples 1 to 5 and 8 to 15 (YE-01, 02, 03, 04, 05, 08, 09, 10, 11, 12, 13, 14 and 15) having a similar structure, for 24 hours, the compound that inhibited cancer cell viability by 50% or more in all the three breast cancer cell lines at a concentration of 10 μM was the compound of Production Example 6 or the compound of Production Example 8. In addition, it was confirmed that, each of three types of gastric cancer, brain cancer and pancreatic cancer cell lines was treated with various concentrations of the compound of Preparation Example 6 or the compound of Preparation Example 8 for 24 hours, the cancer cell viability was effectively inhibited by 50% or more (see FIGS. 4A, 4B and 4C). From the above results, it can be seen that the compound of Production Example 6 and the compound of Production Example 8 having a similar structure according to the present disclosure can more effectively reduce not only the viability of breast cancer cells, but also the viability of gastric cancer, brain cancer and pancreatic cancer cells.

[2-3] Evaluation of AMPK Activation Ability in Cancer Cell Lines

Figure 3B:
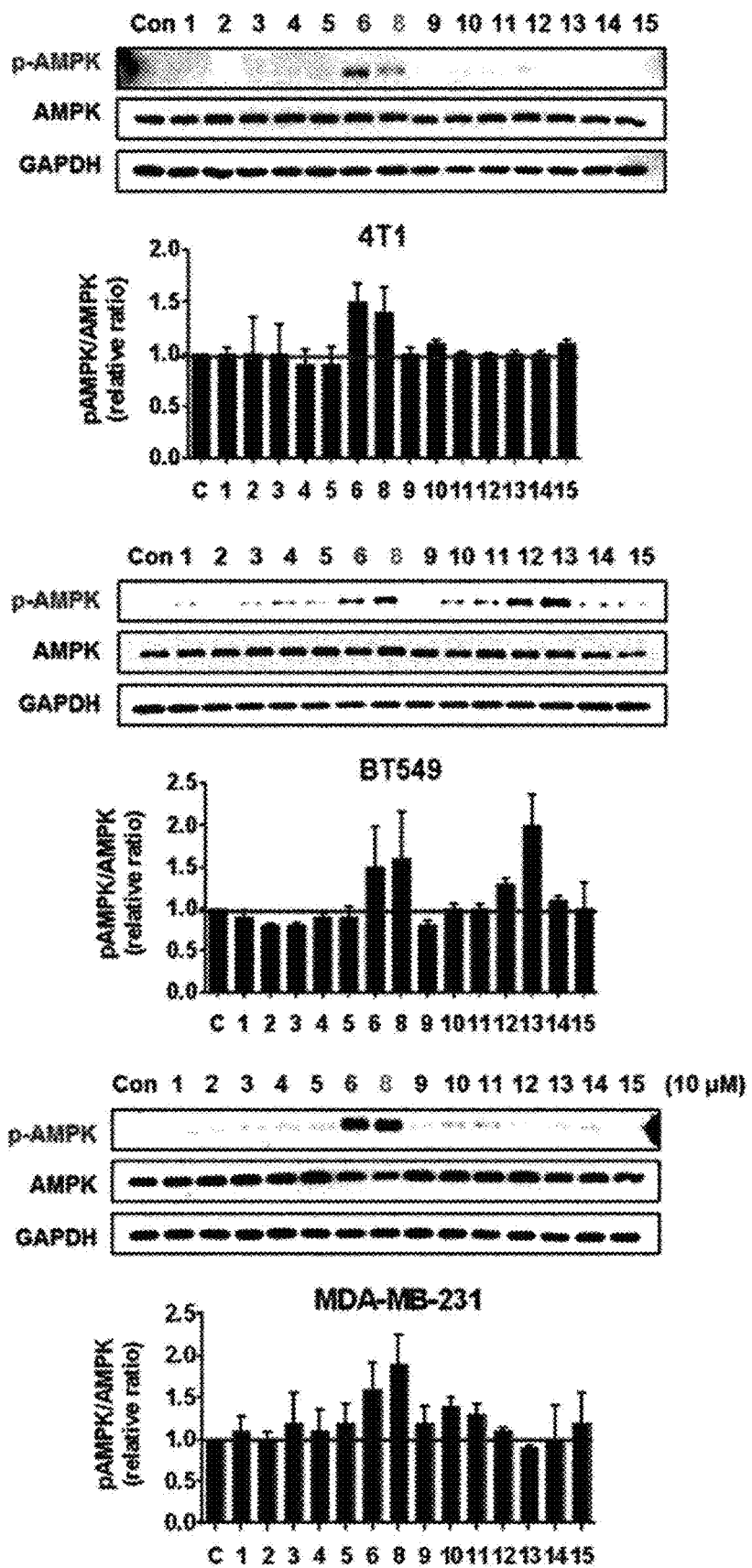
FIG. 3B shows the results of evaluating, by the expression level of p-AMPK (Thr172), the ability of activating AMPK in cancer cells in one example of the present disclosure.
Figure 4A:
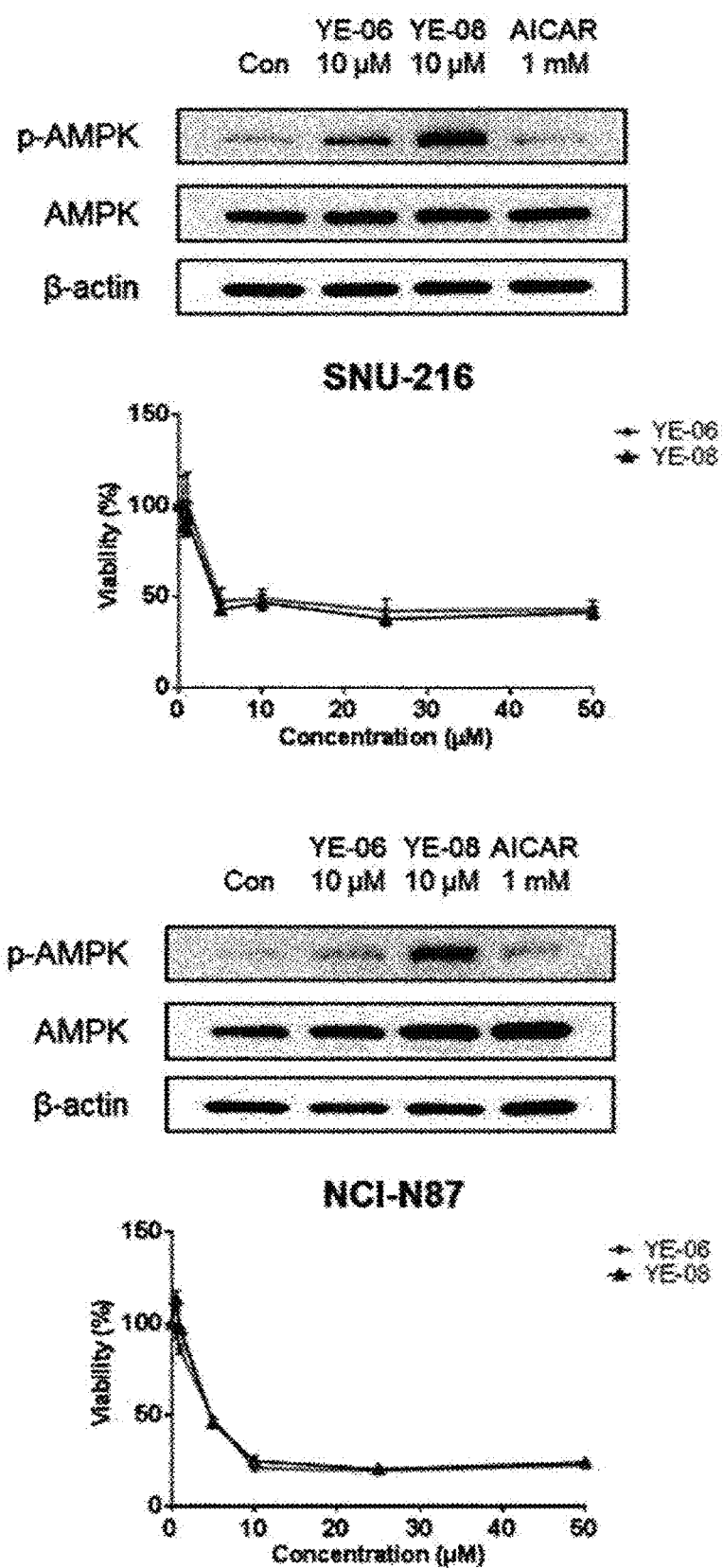
FIGS. 4A, 4B and 4C show the results of evaluating the viability inhibitory effects and AMPK activation abilities of an AMPK activator, a compound of Production Example 6 and a compound of Production Example 8 having a similar structure against gastric cancer, brain cancer and pancreatic cancer cell lines in one example of the present disclosure.
Figure 4B:
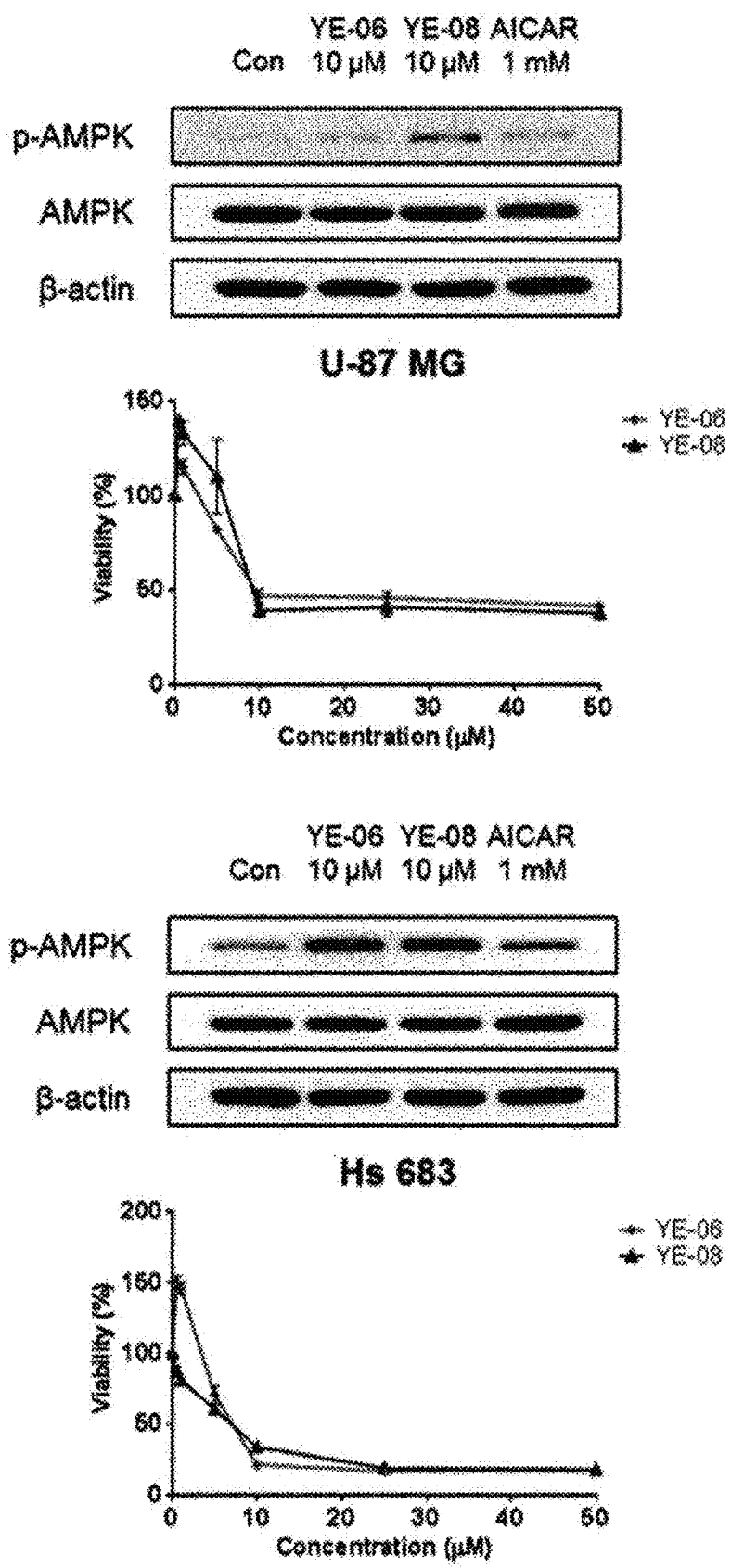
Figure 4C:
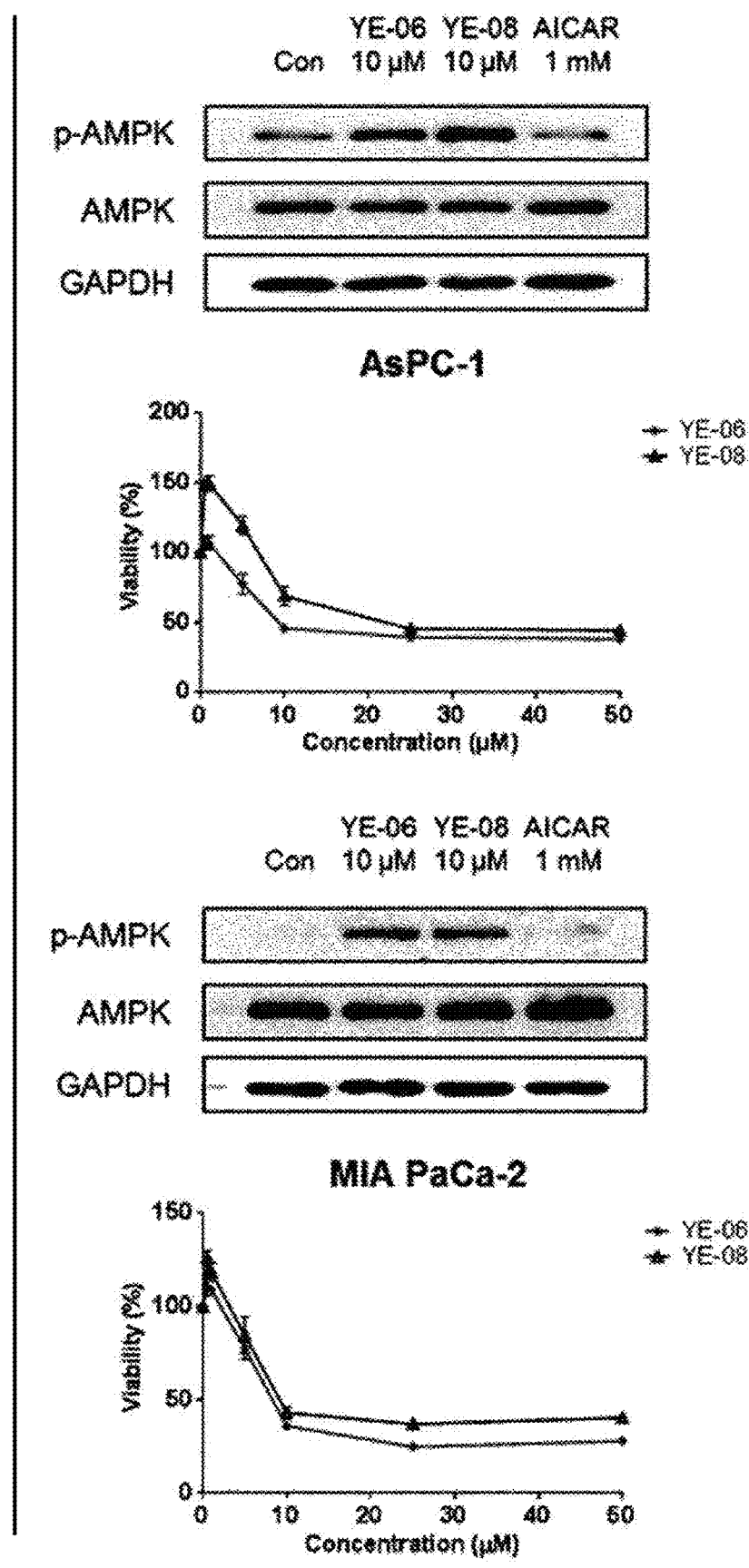

According to the method described in Experimental Method 3 above, the AMPK activation ability in the cancer cell line was evaluated by the expression level of p-AMPK (Thr172), and the results are shown in FIG. 3B. Here, the ratio of p-AMPK/AMPK was graphed by calculating a value normalized to the loading control (GAPDH) of each blot. As shown in FIG. 3B, it was confirmed that, when the 4T1, BT549 and MDA-MB-231 cell lines were treated with each of the compound of Production Example 6 and the compound of Production Example 8, the compound that effectively increased the p-AMPK level in all the three cell lines was particularly the compound of Production Example 6 and the compound of Production Example 8. In addition, it can be confirmed that, when each of three types of gastric cancer, brain cancer or pancreatic cancer cell lines was treated with each of the compound of Production Example 6, the compound of Production Example 8 and AICAR at a concentration of 10 μM for 12 hours, both the compound of Production Example 6 and the compound of Production Example 8 increased the expression of p-AMPK compared to the untreated group (control) (see 4A, 4B and 4C). Here, it can be seen that AICAR used as a positive control had an insignificant effect compared to the compound of Production Example 6 and the compound of Production Example 8, whereas the compound of Production Example 6 and the compound of Production Example 8 having a similar structure according to the present disclosure can more effectively induce AMPK activation in gastric cancer, brain cancer and pancreatic cancer cells in addition to breast cancer cells, compared to the AMPK activator AICAR.

[Example 3] Evaluation of Effect of Inducing Apoptosis of Cancer Cell Lines

Figure 5:
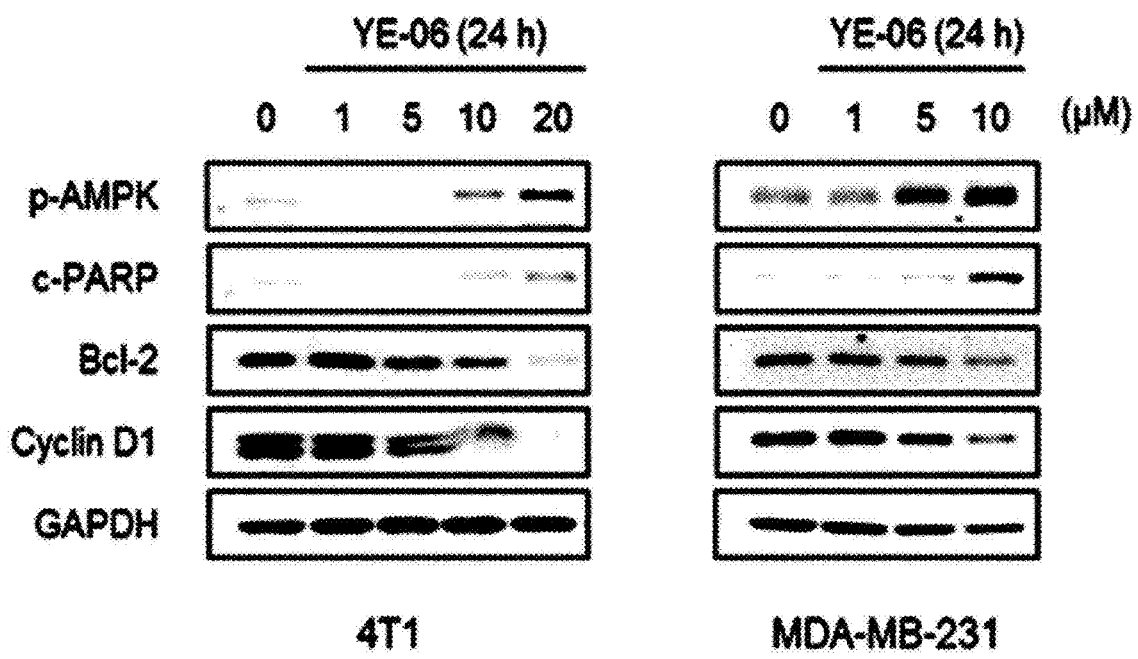
FIG. 5 shows the results of evaluating, by Western blot analysis, the effect of inducing apoptosis of cancer cell lines in one example of the present disclosure.
Figure 6:
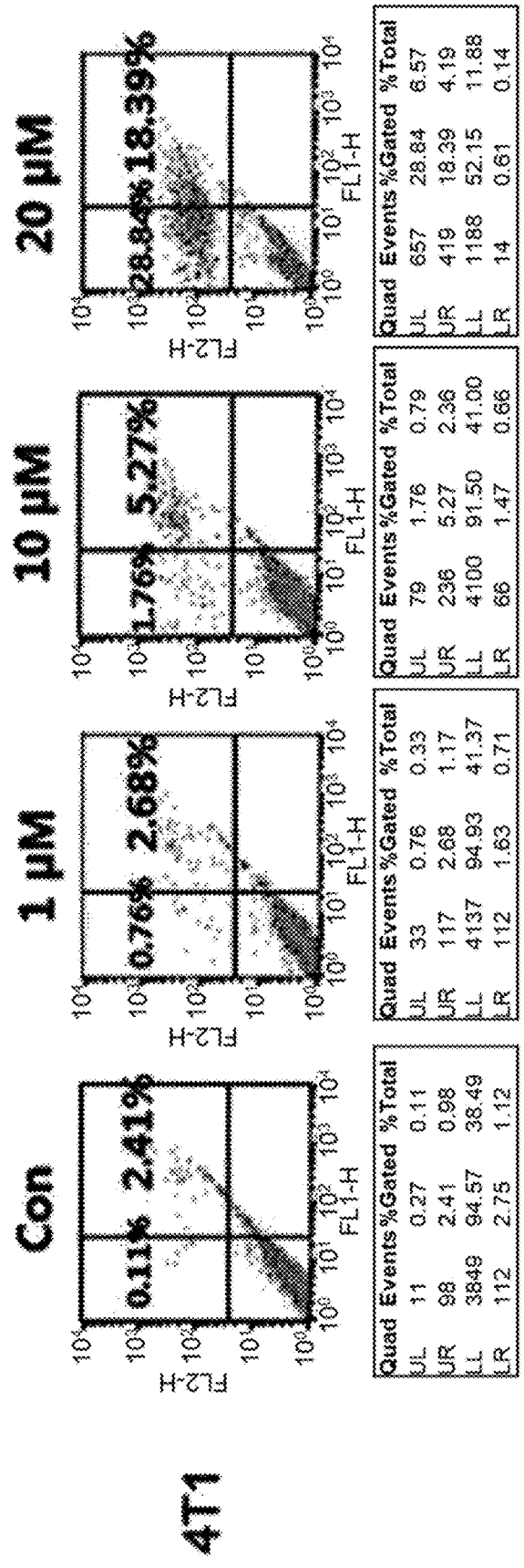
FIG. 6 shows the results of evaluating, by flow cytometry assay, the effect of inducing apoptosis of cancer cell lines in one example of the present disclosure.
Figure 6:
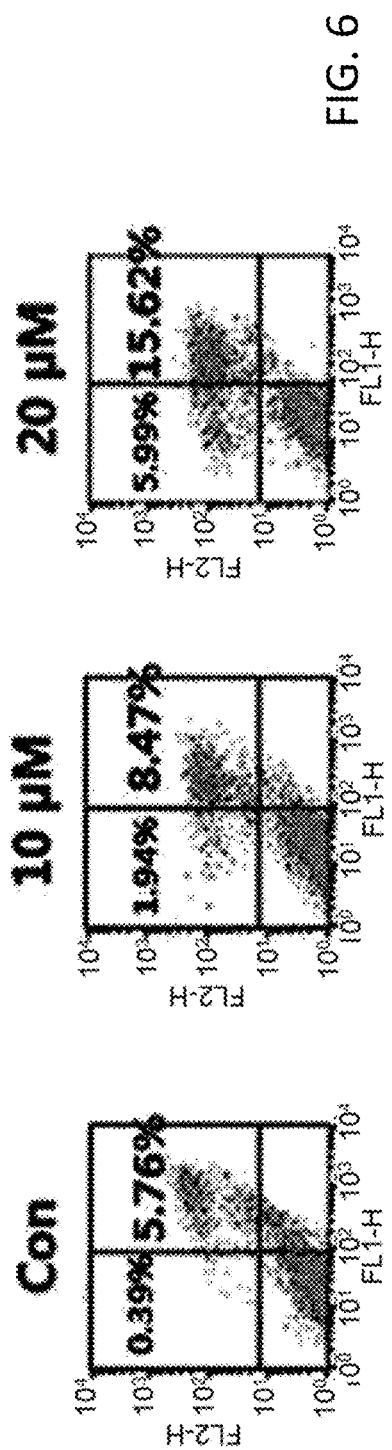

The effect of inducing apoptosis of cancer cells was evaluated by the flow cytometry assay described in Experimental Method 4 and the Western blot assay described in Experimental Method 3, and the results are shown in FIGS. 5 and 6.

As shown in FIG. 5, when both the 4T1 cell line and the MDA-MB-231 cell line were treated with the compound of Production Example 6, the level of the apoptosis marker cleaved-PARP (poly(ADP-ribose) polymerase) protein increased as the phospho-AMPK protein increased in a concentration-dependent manner, and the levels of Bcl-2 and Cyclin D1 proteins decreased.

As shown in FIG. 6, when both the 4T1 cell line and the MDA-MB-231 cell line were treated with the compound of Production Example 6, the cells stained with annexin V or PI increased in a concentration-dependent manner.

From the above results, it can be seen that the compound according to the present disclosure can induce apoptosis of cancer cells.

[Example 4] Evaluation of Effect of Inhibiting EMT of Cancer Cell Lines

Figure 7A:
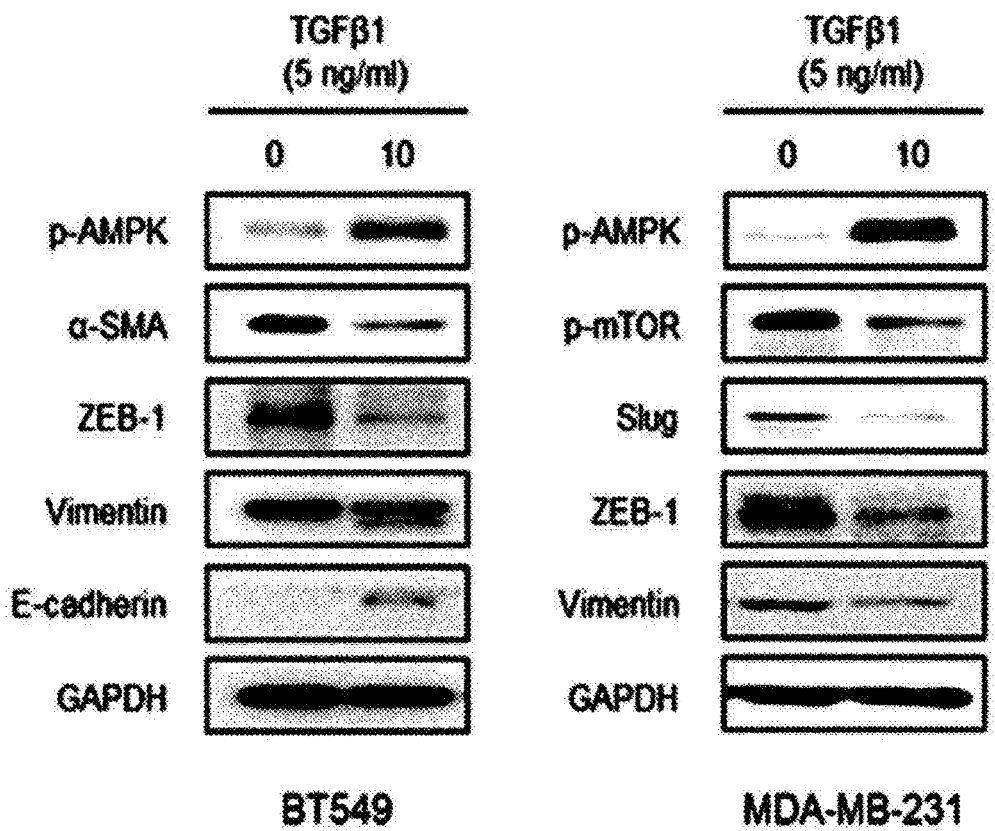
FIGS. 7A and 7B show the results of evaluating, by Western blot analysis, the effect of inhibiting EMI of cancer cell lines in one example of the present disclosure.
Figure 7A:
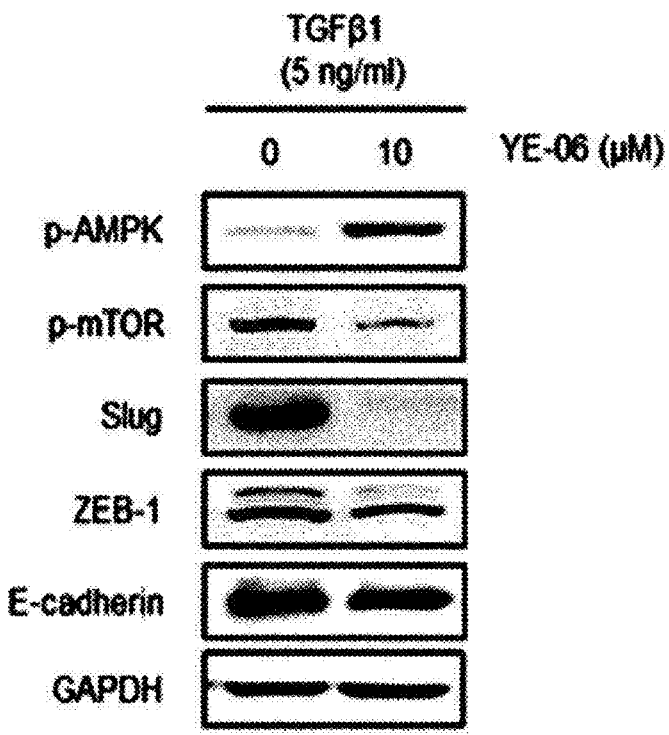
Figure 7B:
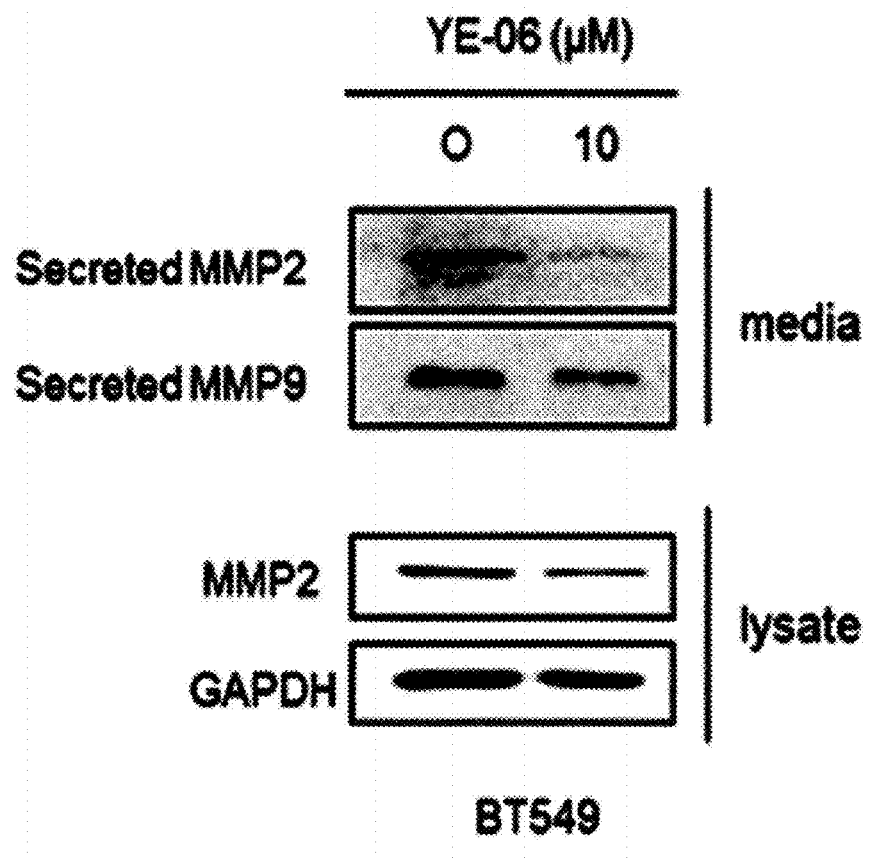

EMT of the cancer cell line was measured according to the method described in Experimental Method 5, and the results are shown in FIGS. 7A and 7B. Here, MMP2 (matrix metalloproteinase 2) and MMP 9 (matrix metalloproteinase 9) are enzymes that degrade type IV collagen, which is an important component of the basement membrane, and are most directly related to cancer migration and metastasis. Thus, the levels of the secreted MMP2 and secreted MMP9 proteins were measured.

As shown in FIG. 7A, the EMT protein markers α-SMA, Vimentin, ZEB-1 and Slug proteins, which increased when all of BT549, MDA-MB-231 and 4T1 cell lines were treated with TGF-β1, decreased when the cell lines were treated with TGF-β1 together with the compound of Production Example 6.

As shown in FIG. 7B, the levels of secreted MMP2 and MMP9, which are EMT protein markers present in the BT549 cell line when treated with TGF-β1, were significantly decreased by treatment with the compound of Production Example 6.

From the above results, it can be seen that the compound according to the present disclosure can very effectively inhibit cancer cell invasion and cancer metastasis by inhibiting EMT of cancer cells.

[Example 5] Evaluation of Tumor Regression Effect in Animal Model

Figure 8A:
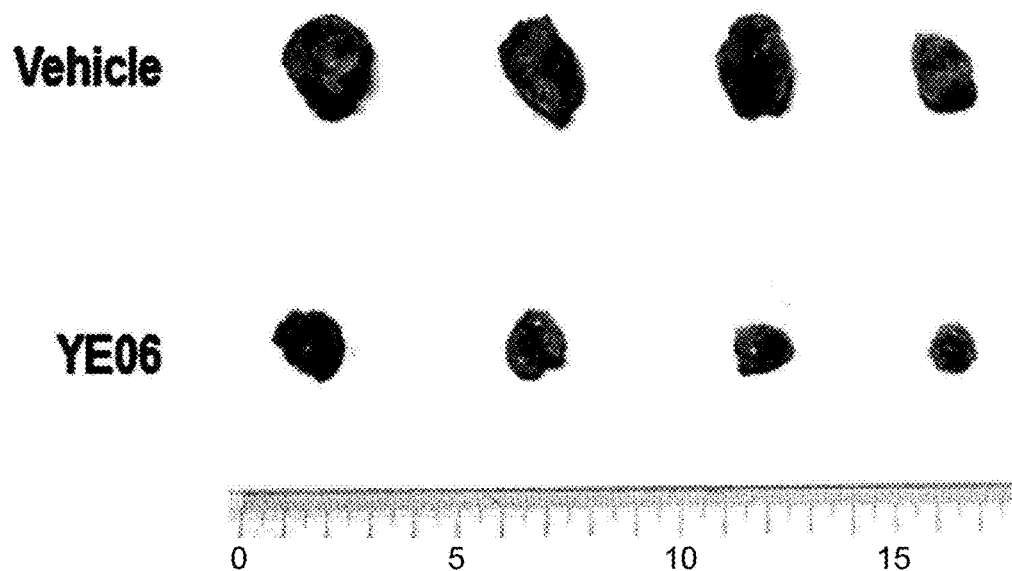
FIGS. 8A, 8B, 8C and 8D show the results of evaluating tumor regression effects in animal models in one example of the present disclosure.
Figure 8B:
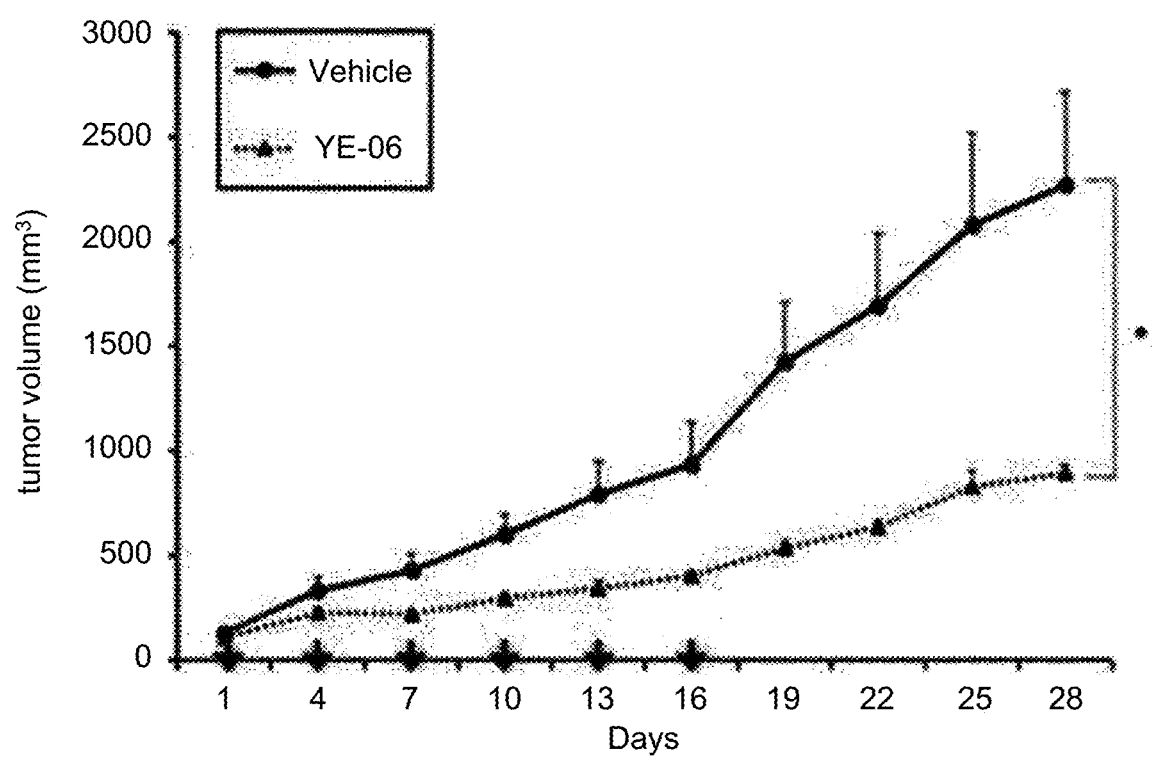
Figure 8C:
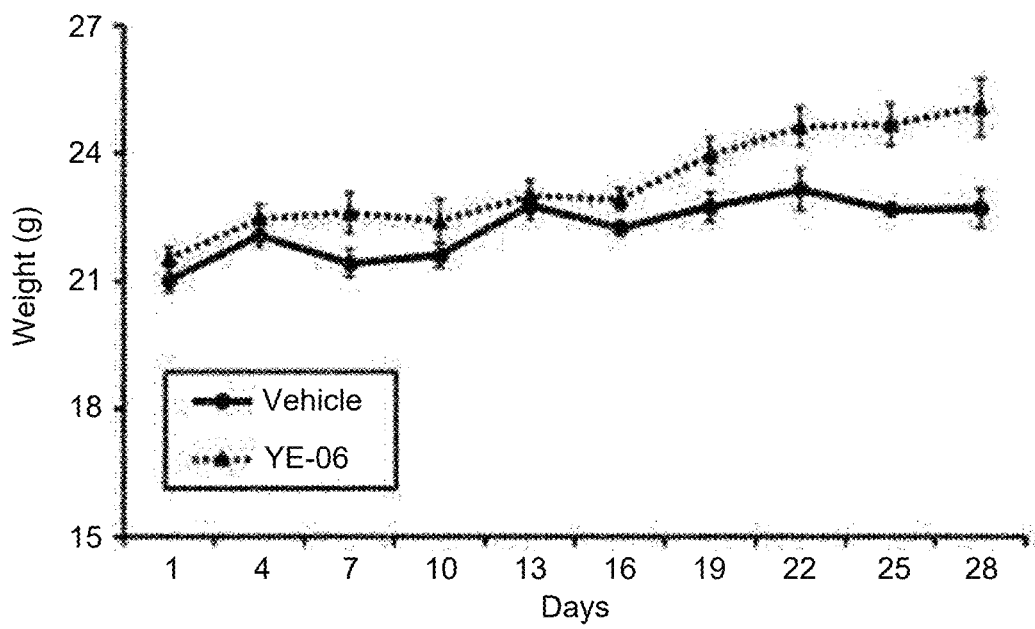

The tumor regression effect of the compound of Production Example 6 was evaluated according to Method 7-1 of Experimental Method 7, and the results are shown in FIGS. 8A, 8B and 8C. In addition, the survival rate improvement effect of the compound of Production Example 6 was evaluated according to Method 7-2 of Experimental Method 7, and the results are shown in FIG. 8D.

As shown in FIGS. 8a to 8c, compared to the case where the compound of Production Example 6 was not administered (Vehicle), the volume of the tumor in the group (YE-06) to which the compound of Production Example 6 was administered decreased in a manner depending on the breeding time of the animal model (FIGS. 8A and 8B). In addition, it was observed that there was no weight loss depending on the breeding time in both the case where the compound of Production Example 6 was not administered (Vehicle) and the case where the compound of Production Example 6 was administered (YE-06) (FIG. 8C).

Figure 8D:
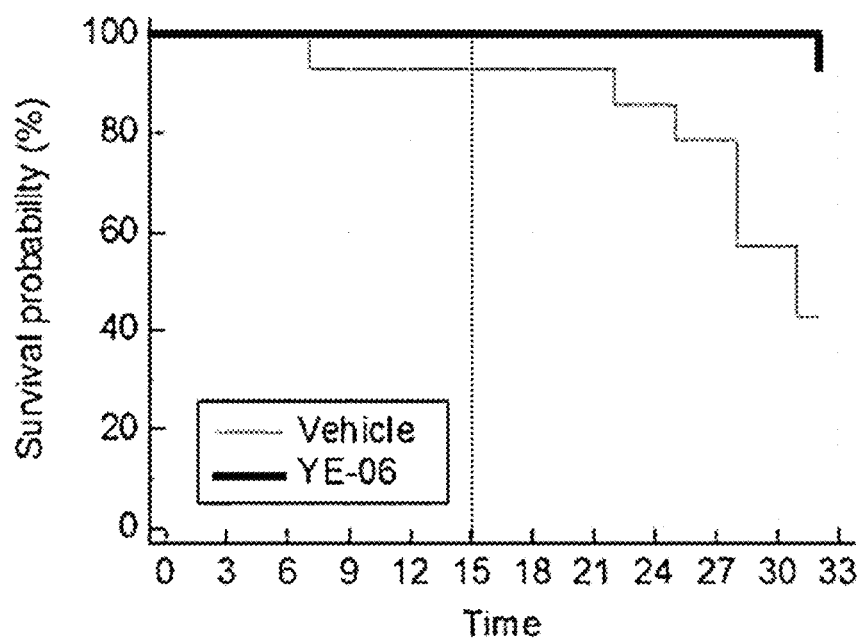

In addition, as shown in FIG. 8D, it was confirmed that the survival rate was significantly improved in the group (YE-06) to which the compound of Production Example 6 was administered, compared to the case where the compound of Production Example 6 was not administered (Vehicle).

From the above results, it can be seen that the compound according to the present disclosure has no toxicity even in the animal model, and administration of this compound can very effectively inhibit tumor growth. Furthermore, it can be seen that the compound according to the present disclosure can significantly increase the overall survival rate of individuals with cancer by effectively inhibiting tumor growth and metastasis in the animal model.

[Example 6] Evaluation of Tumor Metastasis Inhibitory Effect in Animal Model

Figure 9A:
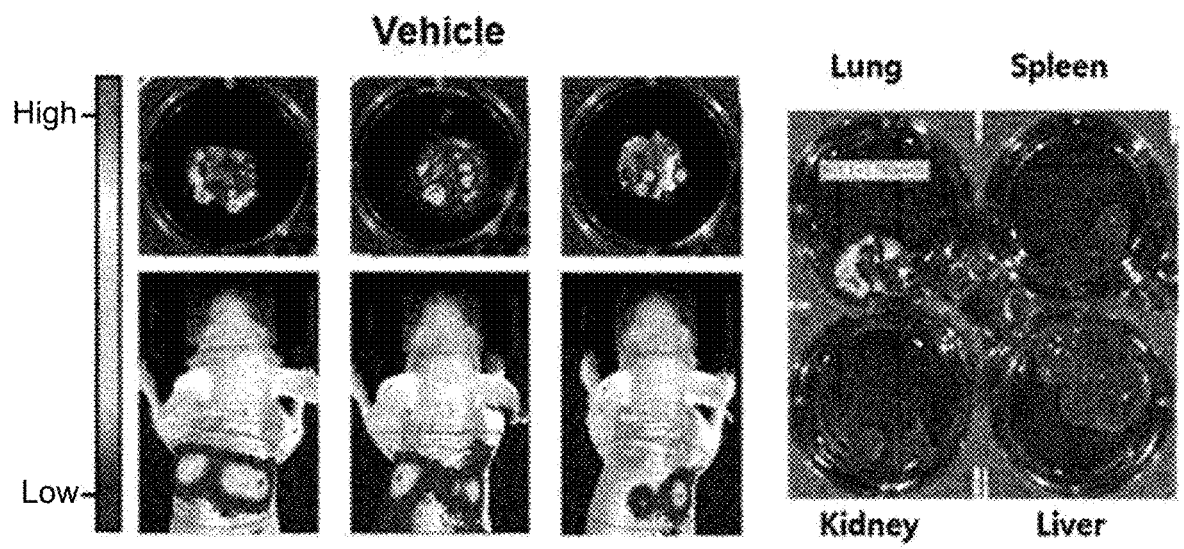
FIGS. 9A and 9B show the results of evaluating the effect of inhibiting tumor metastasis in animal models in one example of the present disclosure.
Figure 9B:
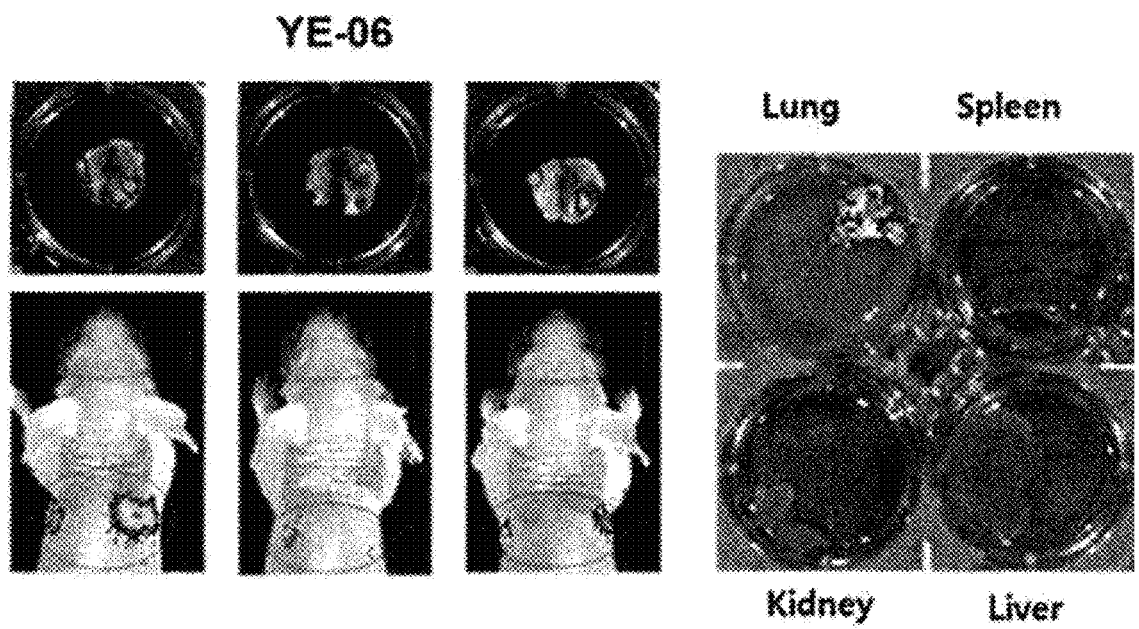

According to Method 7-3 of Experimental Method 7, the tumor metastasis inhibitory effect of the compound of Production Example 6 was evaluated, and the results are shown in FIGS. 9A and 9B.

As shown in FIGS. 9A and 9B, it was confirmed that 4T1-luc metastasis was observed only in the lung among lung, liver, spleen and kidney, and in the case in which the compound of Production Example 6 was not administered (Vehicle), a very high luminescence intensity was observed in the lung of the orthotopic animal model, whereas in the case in which the compound of Production Example 6 was administered (YE-06), the luminescence intensity significantly decreased in the lung of the orthotopic animal model.

From the above results, it can be seen that the compound according to the present disclosure can very effectively inhibit tumor metastasis, particularly lung metastasis, in the animal model.

Although the present disclosure has been described in detail with reference to the specific features, it will be apparent to those skilled in the art that this description is only of a preferred embodiment thereof, and does not limit the scope of the present disclosure. Thus, the substantial scope of the present disclosure will be defined by the appended claims and equivalents thereto.

INDUSTRIAL APPLICABILITY

The composition according to the present disclosure may be very effectively used not only to prevent, ameliorate or treat cancer, but also to inhibit metastasis of cancer by inhibiting the growth of cancer cells and very effectively inhibiting the metastasis of cancer cells to other tissues.

The invention claimed is:

1. A method for preventing or treating cancer comprising administering to a target individual an effective amount of a compound represented by the following Formula 1:

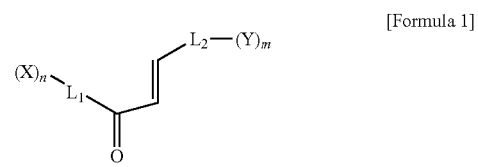

[Formula 1]

wherein:
$L_1$ is phenylene; and $L_2$ is phenylene;
X is —NR'R" and Y is $C_1$ alkoxy;
R' and R" are each independently hydrogen or a substituent represented by the following Formula 4;

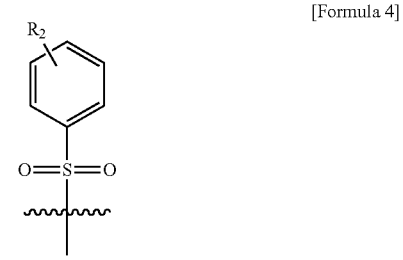

[Formula 4]

in which $R_2$ is halogen, provided that at least one of R' and R" is a substituent represented by the Formula 4; and
n is 1 and m is 2.

2. The method of claim 1, wherein the compound is

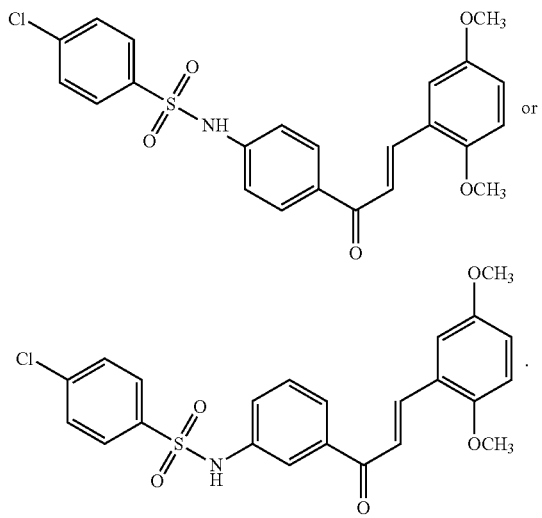

3. The method of claim 1, wherein the cancer is at least one selected from the group consisting of breast cancer, colorectal cancer, lung cancer, liver cancer, gastric cancer, esophageal cancer, pancreatic cancer, gallbladder cancer, kidney cancer, bladder cancer, prostate cancer, testicular cancer, colon cancer, cervical cancer, endometrial cancer, chorionic carcinoma, skin cancer, ovarian cancer, thyroid cancer, brain cancer, blood cancer, head and neck cancer, malignant melanoma, and lymphoma.

4. The method of claim 1, wherein R' is the substituent represented by the Formula 4 and R" is hydrogen.

5. A method for preventing or treating cancer comprising administering to a target individual an effective amount of a compound represented by the following Formula 1:

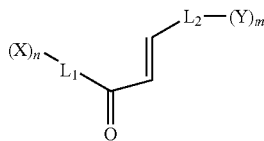

and an anticancer drug,
wherein:
L₁ is phenylene; and L₂ is phenylene;
X is —NR'R" and Y is C₁ alkoxy;
R' and R" are each independently hydrogen or a substituent represented by the following Formula 4;

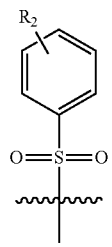

in which $R_2$ is halogen, provided that at least one of R' and R" is a substituent represented by the Formula 4; and
n is 1 and m is 2.

6. The method of claim 5, wherein the compound is

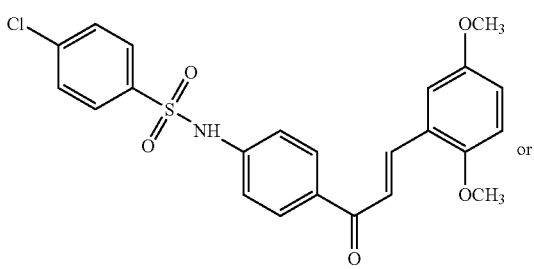

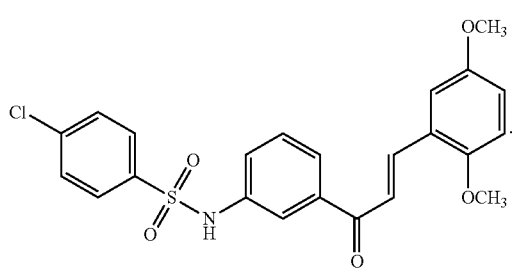

7. The method of claim 5, wherein R' is the substituent represented by the Formula 4 and R" is hydrogen.

8. A method for inhibiting metastasis of cancer comprising administering to a target individual an effective amount of a compound represented by the following Formula 1:

[Formula 1]

wherein:
L₁ is phenylene; and L₂ is phenylene;
X is —NR'R" and Y is C₁ alkoxy;
R' and R" are each independently hydrogen or a substituent represented by the following Formula 4;

[Formula 4]

in which $R_2$ is halogen, provided that at least one of R' and R" is a substituent represented by the Formula 4; and
n is 1 and m is 2.

9. The method of claim 8, wherein the compound is

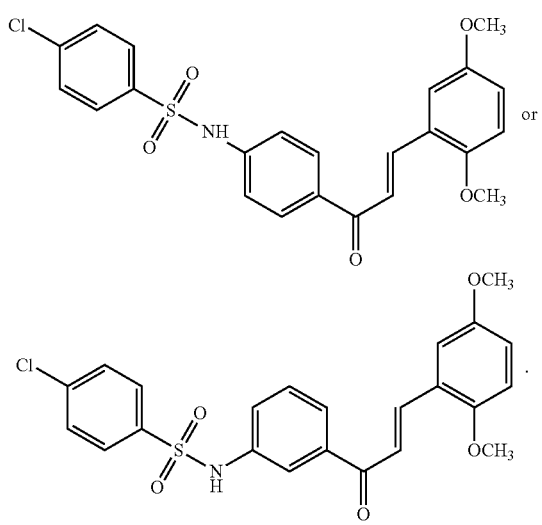

10. The method of claim 8, wherein the cancer is at least one selected from the group consisting of breast cancer, colorectal cancer, lung cancer, liver cancer, gastric cancer, esophageal cancer, pancreatic cancer, gallbladder cancer, kidney cancer, bladder cancer, prostate cancer, testicular cancer, colon cancer, cervical cancer, endometrial cancer, chorionic carcinoma, skin cancer, ovarian cancer, thyroid cancer, brain cancer, blood cancer, head and neck cancer, malignant melanoma, and lymphoma.

11. The method of claim 8, wherein R' is the substituent represented by the Formula 4 and R" is hydrogen.

12. A method for inhibiting metastasis of cancer comprising administering to a target individual an effective amount of a compound represented by the following Formula 1:

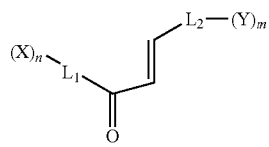

[Formula 1]

and an anticancer drug,
wherein:

$L_1$ is phenylene; and $L_2$ is phenylene;

X is —NR'R" and Y is $C_1$ alkoxy;

R' and R" are each independently hydrogen or a substituent represented by the following Formula 4;

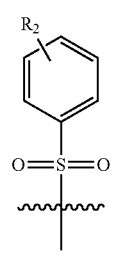

[Formula 4]

in which $R_2$ is halogen, provided that at least one of R' and R" is a substituent represented by the Formula 4; and n is 1 and m is 2.

13. The method of claim 12, wherein the compound is

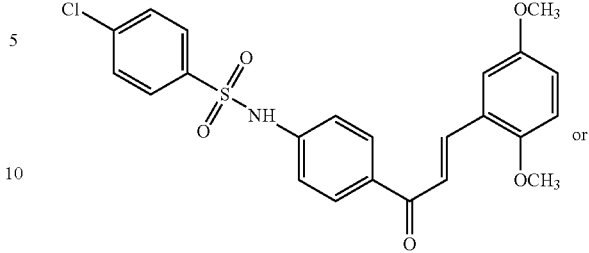

or

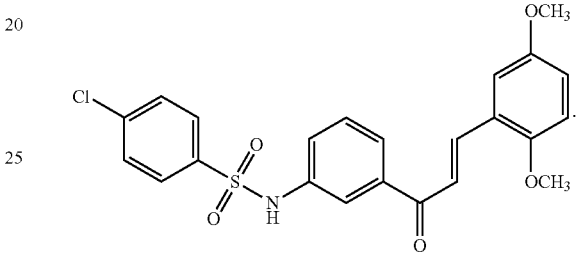

14. The method of claim 12, wherein R' is the substituent represented by the Formula 4 and R" is hydrogen.

* * * * *